(12) United States Patent
Therkelsen

(10) Patent No.: US 7,528,248 B2
(45) Date of Patent: *May 5, 2009

(54) HETEROGENOUS CARRAGEENAN MANUFACTURING PROCESS WITH RECOVERY OF ALKALI

(76) Inventor: Georg Therkelsen, 22, Snerlevej, DK-4000 Roskilde (DK)

( * ) Notice: Subject to any disclaimer, the term of this patent is extended or adjusted under 35 U.S.C. 154(b) by 252 days.

This patent is subject to a terminal disclaimer.

(21) Appl. No.: 10/498,344

(22) PCT Filed: Dec. 23, 2002

(86) PCT No.: PCT/DK02/00906

§ 371 (c)(1),
(2), (4) Date: Jun. 16, 2004

(87) PCT Pub. No.: WO03/059957

PCT Pub. Date: Jul. 24, 2003

(65) Prior Publication Data

US 2005/0080253 A1    Apr. 14, 2005

(30) Foreign Application Priority Data

Dec. 28, 2001    (DK) ............................ 2001 01960

(51) Int. Cl.
C07H 1/08    (2006.01)
(52) U.S. Cl. .................... 536/128; 536/114; 536/118
(58) Field of Classification Search .............. 536/123.1, 536/128
See application file for complete search history.

(56) References Cited

U.S. PATENT DOCUMENTS

| | | | |
|---|---|---|---|
| 2,811,451 A | 10/1957 | Tjoa | |
| 3,094,517 A | 6/1963 | Stanley | |
| 3,176,003 A | 3/1965 | Stancioff | |
| 3,879,890 A | 4/1975 | Chen et al. | |
| 3,907,770 A | 9/1975 | Strong | |
| 4,443,486 A | 4/1984 | Guiseley | |
| 4,765,886 A | 8/1988 | Whitaker | |
| 4,816,573 A | 3/1989 | Whitaker | |
| 5,777,102 A | 7/1998 | Larsen | |
| 5,801,240 A | 9/1998 | Rideout et al. | |

FOREIGN PATENT DOCUMENTS

| | | |
|---|---|---|
| CA | 561448 | 8/1958 |
| CL | 00125-1996 | 9/1996 |
| EP | 0465373 | 1/1992 |
| IE | 912360 | 7/1990 |
| WO | 94/22922 | 10/1994 |
| WO | 03/059955 | 7/2003 |
| WO | 03/059956 | 7/2003 |

OTHER PUBLICATIONS

M. Ciancia et al., "Akali-Modification of Carrageenans: Mechanism and Kinetics in the Kappa/Iota-, mu/nu- and lambda-series", Carbohydrate Polymers, vol. 20, pp. 95-98 (1993).
E.L. McCandless et al., "Carrageenans in the Gametophytic and Sporophytic Stages of Chondrus Crispus", Planta (Berl.), vol. 112, pp. 201-212 (1973).
U.S. Appl. No. 10/498,343 to Georg Therkelsen, filed Dec. 23, 2002.
U.S. Appl. No. 10/498,342 to Georg Therkelsen, filed Dec. 23, 2002.

*Primary Examiner*—Elli Peselev
(74) *Attorney, Agent, or Firm*—Patricia L. Ades; Cheryl J. Tubach

(57) ABSTRACT

An improved process for the manufacture of gelling carrageenans from seaweed, wherein the seaweed is subjected to a heterogenous reaction for alkali modification of at least one carrageenan precursor to at least one gelling carrageenan followed by a recovery process. In the recovery process one or more lye recovery sections for the recovery of aqueous alkaline medium are used and there is reusing in the heterogeneous reaction of used aqueous alkaline medium after processing of incoming seaweed and for each recovery section there is reusing of at least part of the used lye recovery solution to compensate for the deficiency of alkaline medium as a result of the heterogeneous reaction.

37 Claims, 12 Drawing Sheets

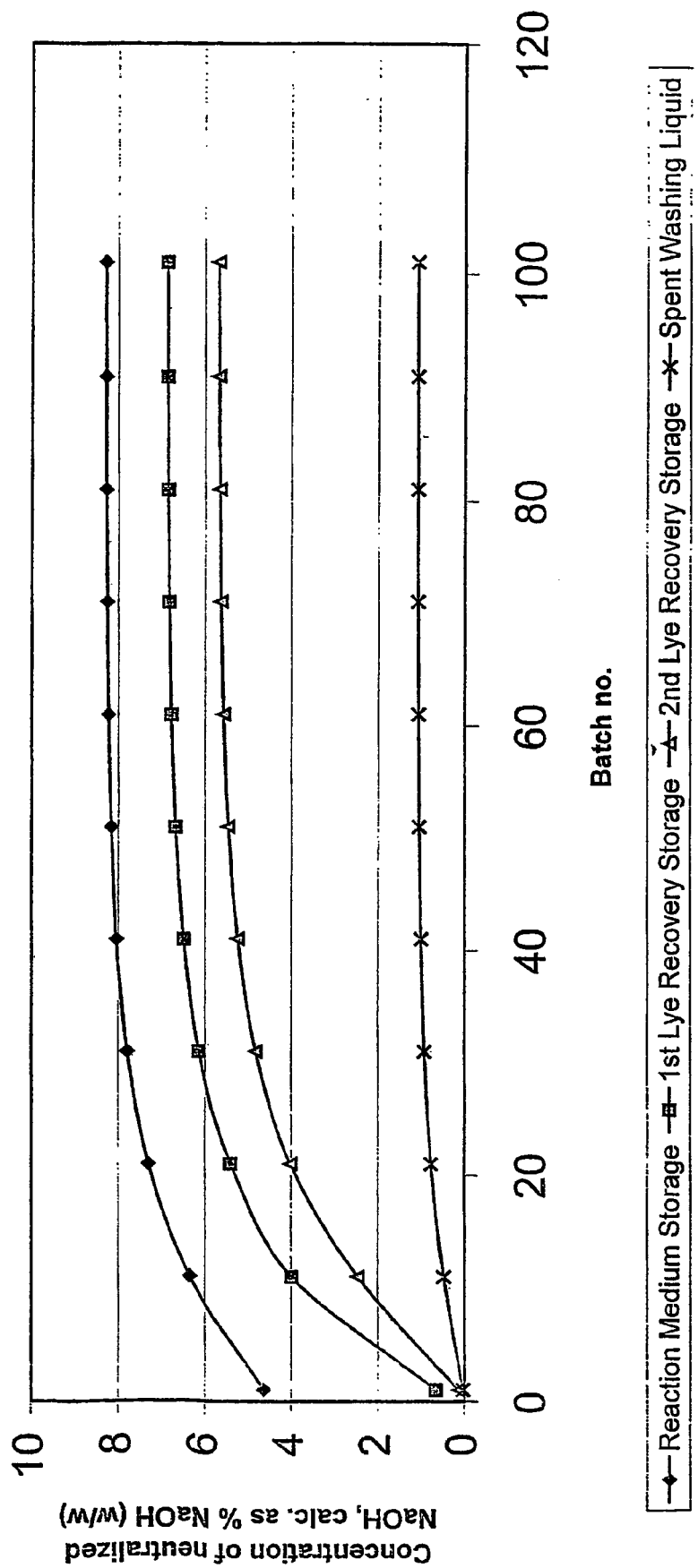
Fig. 9 Calculated Solute Concentrations (from neutralising NaOH) in the Lye Recovery Process

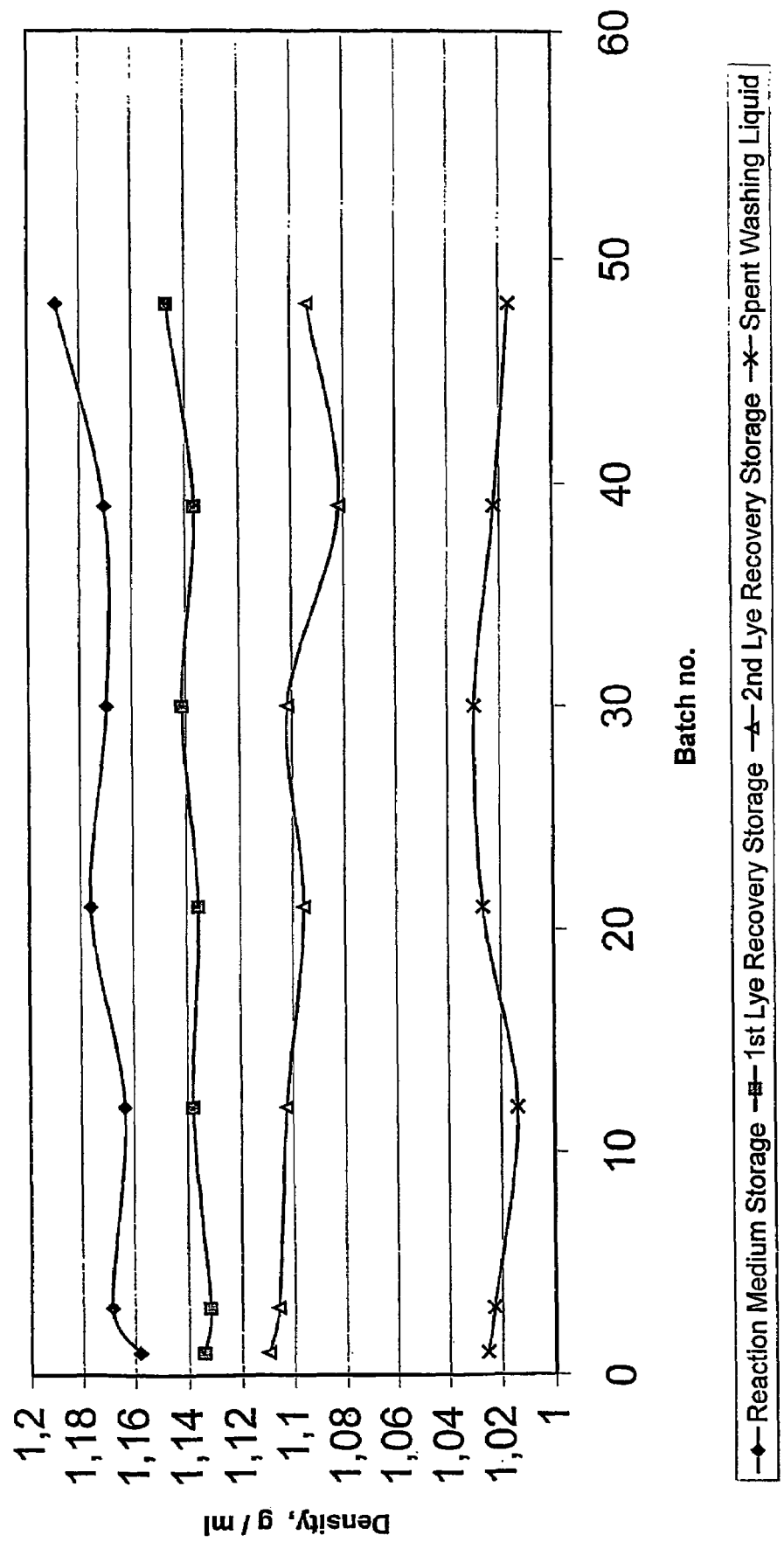
Fig. 10 Experimental Densities of the Liquids in the Lye Recovery Process

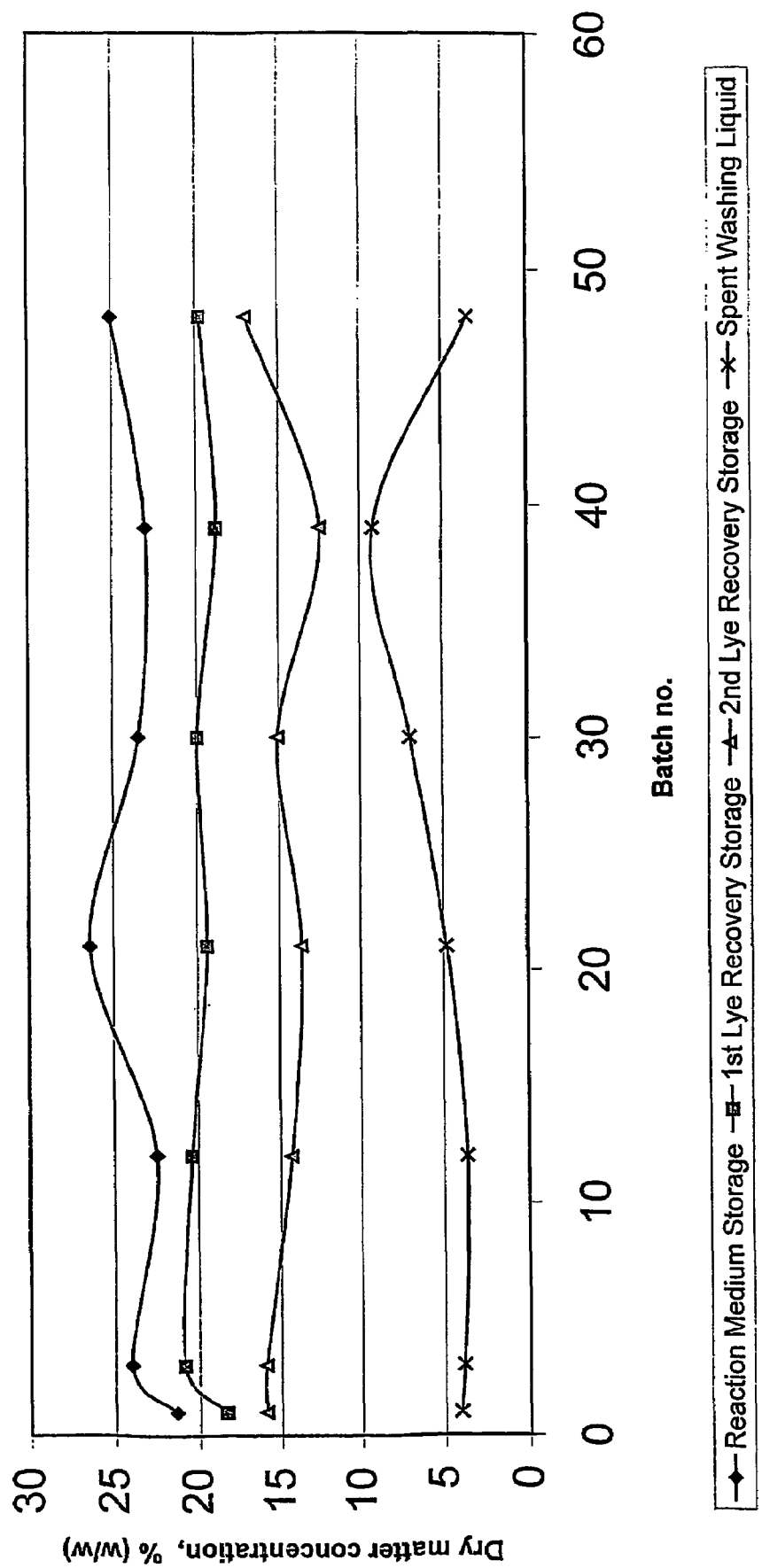
Fig. 11 Experimental Dry Matter Concentrations of the Liquids in the Lye Recovery Process

HETEROGENOUS CARRAGEENAN MANUFACTURING PROCESS WITH RECOVERY OF ALKALI

CROSS-REFERENCE TO RELATED APPLICATION

This Application is a Section 371 filing of International Application No. PCT/DK2002/00906, filed 23 Dec. 2002, the disclosure of which is incorporated herein by reference.

TECHNICAL FIELD

The present invention relates to an improved process for the manufacture of carrageenans from seaweed. More specifically the present invention relates to an improved process for the manufacture of carrageenans, wherein seaweed, in particular dry seaweed is processed in a process involving a heterogenous reaction, a recovery process comprising one or more lye recovery sections, optionally a washing process and optionally further conventional work-up, wherein at least part of the liquid remaining after processing the incoming seaweed in each of the sections are reused in a specific way when processing subsequently incoming seaweed. The inventive process provides for substantial savings in consumption of alkali employed in the reaction as well as a reduction in amount of alkali in effluent. The present invention furthermore relates to carrageenan products obtainable by this process.

BACKGROUND ART

Carrageenans comprise a class of polymeric carbohydrates which are obtainable by extraction of certain species of the class Rhodophyceae (red seaweed). In an idealised carrageenan the polymeric chain is made up of alternating A- and B-monomers thus forming repeating dimeric units. However in crude seaweed and thus in processed and purified carrageenans as well this regularity is often broken by some monomeric moieties having a modified structure.

Some carrageenans present particularly desirable hydrocolloid characteristics in the presence of certain cations and thus exhibit useful properties in a wide range of applications. Accordingly carrageenans are used as gelling and viscosity modifying agents in food as well as in non-food products, such as dairy products, gummy candy, jams and marmalade, pet foods, creams, lotions, air fresheners, gels, paints, cosmetics, dentifrices etc.

In the aforementioned applications the carrageenans are used either as a refined carrageenan (RC) product or as a semirefined carrageenan (SRC) product containing other seaweed residues.

As stated above the carrageenans comprise alternating A- and B-monomers. More specifically the carrageenans comprise chains of alternating moieties of a more or less modified D-galactopyranose in a $\alpha(1 \rightarrow 3)$ linkage and a more or less modified D-galactopyranose in a $\beta(1 \rightarrow 4)$ linkage, respectively. The different types of carrageenans are classified according to their idealised structure as outlined in Table 1 below.

TABLE 1

| Carrageenan | 3-linked residue (= B) | 4-linked residue (= A) |
|---|---|---|
| Beta (β) | Beta-D-galactopyranose | 3,6-anhydrogalactopyranose |
| Kappa (κ) | Beta-D-galactopyranose-4-sulphate | 3,6-anhydrogalactopyranose |

TABLE 1-continued

| Carrageenan | 3-linked residue (= B) | 4-linked residue (= A) |
|---|---|---|
| Iota (ι) | Beta-D-galactopyranose-4-sulphate | 3,6-anhydrogalactopyranose-2-sulphate |
| Mu (μ) | Beta-D-galactopyranose-4-sulphate | galactopyranose-6-sulphate |
| Nu (ν) | Beta-D-galactopyranose-4-sulphate | galactopyranose-2,6-disulphate |
| Lambda (λ) | Beta-D-galactopyranose-2-sulphate (70%) and galactopyranose (30%) (for Chondrus) | galactopyranose-2,6-disulphate |
| Theta (θ) | Galactopyranose-2-sulphate (70%) and galactopyranose (30%) (for Chondrus) | 3,6-anhydrogalactopyranose-2-sulphate |
| Xi (ξ) | Beta-D-galactopyranose | 2-Alpha-D-galactopyranose-2-sulphate |

Normally the polymer chains originating from seaweed deviate from the ideal structure in having irregularities present, such as eg. single moieties within the chain possessing a higher or lower number of sulphate groups. Also co-polymer types (or hybrid types) of carrageenans having two alternating sequences each representing different repeating dimeric units of two monomers are present in some seaweed species. Accordingly a vast array of different carrageenan materials having different properties exists.

The extent of gelling ability of the different types of carrageenans is inter alia determined by the amount of hydrophilic groups in the galactopyranose rings, molecular weight, temperature, pH and type and concentrations of salts in the solvent with which the hydrocolloid is mixed.

For gelling purposes, organoleptic and water binding purposes as well as texture and viscosity modifying purposes the most interesting and widely used carrageenans are the kappa-, iota-, theta- and lambda-carrageenans. These are not all present in the crude seaweed, but some of these are obtained by alkali modification of precursor carrageenans (mu-, nu- and lambda-carrageenan respectively) present in the crude seaweed according to the following reaction scheme:

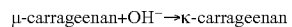

Thus by alkali treatment of crude seaweed an intramolecular ether bond is formed within one of the ring moieties in the dimeric units of the carrageenan polymer providing less hydrophilic character to the polymer and accordingly rendering the polymer a more powerful gelling agent. The gelling properties are caused by the carrageenans organizing in a tertiary helical structure.

The kappa and iota structures (and their precursors) differ only by one sulphate group and are in fact always to some extent found in the same molecular chains from one seaweed material, and for this reason this group of carrageenan structures are called the "kappa family" of carrageenan structures. Almost pure kappa/mu respectively iota/nu providing seaweed exist, however, as do seaweeds that provide more equally balanced copolymers or "kappa/iota hybrids".

Likewise, the xi and lambda (and its modified structure, theta after processing) are always found in distinct seaweed material which gives rise to the term "lambda family" for this group of carrageenan structures.

Whereas the isolated lambda- and theta-carrageenans are water soluble under almost every condition of temperature and salt concentration, the kappa- and iota-carrageenans—in the potassium salt form—are insoluble in cold water. All of the above carrageenans are soluble in hot water. The kappa- and iota-carrageenans are able to form gels in the presence of $K^+$, $Ca^{2+}$, $Mg^{2+}$, $Ba^{2+}$, $Sr^{2+}$ and $NH_4^+$. The lambda and theta-carrageenans on the other hand do not form gels.

Some commercially available red seaweed species or populations contain only one carrageenan type (and its precursor). These are called "mono component seaweeds" in the present application. The commercially available seaweed *Eucheuma cottonii* (also known in the scientific literature as *Kappaphycus alvarezii* (Doty)) belongs to this category containing only one family of carrageenans, the "kappa family".

Other examples of commercially available mono-component seaweed are *Eucheuma spinosum* (also known in the scientific literature as *Eucheuma denticulatum*), *Hypnea* spp. and *Furcellaria* spp.

However many available red seaweed species or populations contain at least two carrageenan types (including some of their precursors). These are in the present application called "bi-component seaweeds". The commercially available seaweed *Chondrus crispus* belongs to this category, containing the "kappa family" as well as the "lambda family" of carrageenan structure, reportedly it maybe in the ratio of 70% kappa and 30% lambda. Other examples of commercially available bi-component seaweeds are several species from the *Gigartina* genus.

In the present application the term "gelling carrageenan" will be used for those carrageenan types which are able to form gels. Thus, the kappa family of carrageenans are "gelling carrageenans", whereas the lambda family of carrageenans are not. The term "gelling carrageenan precursor" denotes in the present application a carrageenan precursor which becomes gelling after alkali modification. Thus the precursor itself may be non-gelling.

Traditionally carrageenans have been manufactured by extraction processes. Thus after wash, the seaweed has been subjected to an extraction with water at high temperature. The liquid extract is then purified by centrifugation and/or filtration. After this, the hydrocolloid is obtained either by evaporation of water or by selective precipitation by a potassium salt, or by an alcohol, such as isopropanol. This method of manufacture yields a pure and concentrated product, but suffers from high production cost.

U.S. Pat. No. 2,811,451 (Tjoa) discloses a treatment of seaweed wherein the seaweed is first rinsed and crushed and extracted with water (neutral, acidic or alkaline). By extraction at different temperatures, hydrocolloids with different properties are obtained. The obtained extracts may be used as is or may be further processed to obtain a powdery hydrocolloid.

In U.S. Pat. No. 3,094,517 (Stanley) a typical homogenous process for making carrageenan is disclosed. The process involves the use of an alkali, preferably calcium hydroxide. An excess of calcium hydroxide, which may amount to 40% to 115% of the weight of carrageenan present in the seaweed, has proven especially effective. The mixture of seaweed and alkali is then heated to temperatures ranging from 80° C. to 150° C., for a period of 3-6 hours. The excess alkali may be recovered for reuse, after which filter aid is added and filtration accomplished by any suitable type of equipment, while the mixture is still hot. The filtered extract is then neutralized using any suitable acid. When filtered, the extract is drum dried, spray dried or coagulated with alcohol. When alcohol precipitation is employed, the resulting coagulate is dried using conventional methods.

Rideout et al. in U.S. Pat. No. 5,801,240 refer to a prior art method for the production of semi refined or crude carrageenan, and U.S. Pat. No. 5,801,240 relates to improvements to this process. The method of Rideout et al. involves a number of steps: First the raw seaweed is cleaned and sorted. The cleaned and sorted seaweed is then rinsed at ambient temperature with either fresh water or a recycled potassium hydroxide wash. The seaweed is then placed in an aqueous potassium hydroxide cooking solution at 60-80° C. (2 hours at 12 wt % KOH or 3 hours at 8 wt % KOH) to modify the carrageenan and to dissolve some of the alkali soluble sugars. After cooking, the seaweed is removed and drained, and is then put through a series of wash steps to reduce the pH, to wash away residual potassium hydroxide, and to dissolve sugars and salts. Lastly, the resulting semi refined carrageenan is chopped, dried and ground. The inventive process by Rideout et al. further comprises the steps of monitoring the reaction progress by measuring the oxidation-reduction potential and stopping the reaction when an equilibrium as measured by a predetermined constant value of this potential is reached.

Thus, according to prior art, at least some carrageenans may be manufactured by a homogeneous process in which the carrageenan enters into solution, as well as by a heterogenous process, wherein the carrageenan remains undissolved. In the carrageenan manufacturing industry, however, the heterogenous process is preferred as this process does not require huge amounts of water for handling the very viscous extracts of carrageenan obtained when the carrageenan dissolves.

Accordingly, the most widely used way of conducting a heterogenous process according to the prior art is by reacting wet seaweed with KOH in a hot solution, as KOH quite efficiently provides for alkali modification of precursor carrageenans as well as for suppressing the solubility of the modified carrageenan, thus enabling low reaction volumes.

Thus, as both $K^+$ and $OH^-$ are needed from the added KOH, it is not possible to cost-optimize the concentration of each of these individually without having to add the needed ion in the form of another salt, meaning an extra cost.

Although the seaweed is dried prior to transportation due to transportation cost concerns, the seaweed is traditionally supplied in a wet state in the alkali modification step in the processes for the manufacturing of SRC and RC according to the methods of the prior art by washing the seaweed. The reason for this washing prior to the alkali modification step is that it has previously been considered advantageous to wash out any residual salts from the seaweed. Also residues of sand and other contaminating matter has been washed out this way.

One drawback of the prior art method using KOH as the alkali is that KOH is an expensive chemical. Thus according to the prior art method of Rideout et al., supra, the KOH present in the seaweed is simply washed out via a series of subsequent washing steps to obtain a semirefined carrageenan product. Also, in a preferred embodiment of this prior art method of Rideout et al., the step following the alkali processing step is an acidic neutralization step using e.g. aqueous HCl. In this way of conducting the washing, the recovery of the alkali is excluded. Another consequence of this non-recovery of alkali, is that considerable amounts of anthropogenic chemicals will end up in the effluent and thus very likely also in the environment.

Accordingly it would be desirable to provide a method for the manufacture of carrageenans in a heterogenous process having a process set-up which enables a high degree of recovery of the alkali employed for the modification of precursor carrageenan in the reaction.

It has now been found, that a special process set-up for the manufacture of carrageenans comprising a heterogenous reaction in which seaweed, in particular dry seaweed, is reacted in an aqueous alkaline medium, a recovery process comprising one or more lye recovery sections, optionally washing and further conventional work-up, enables a very high degree of recovery of the aqueous alkaline medium remaining after the reaction, thus providing for substantial savings in consumption of alkali employed as well as savings in costs for neutralizing the effluent due to the reduction of the amount of alkali in the effluent.

BRIEF DESCRIPTION OF THE INVENTION

Accordingly the present invention relates to a process for the manufacture of gelling carrageenan(s) wherein incoming seaweed, in particular dry seaweed containing gelling carrageenan precursor(s) and optionally other type(s) of carrageenan(s) is subjected to
  i) a heterogenous reaction in an aqueous alkaline medium having a alkali concentration and a temperature which enable the modification to the desired extent of the gelling carrageenan precursor(s) to the gelling carrageenan(s);
  ii) a recovery process comprising one or more lye recovery sections for the recovery of used aqueous alkaline medium employed in i), in each of which the seaweed is contacted with a lye recovery solution;
  iii) optionally a washing process comprising one or more washing sections to wash out excess alkali;
  iv) optionally drying and grinding to obtain semirefined carrageenan (SRC);
  v) optionally further extraction, purification and isolation to obtain refined carrageenan (RC)

characterized in that used aqueous alkaline medium obtained after processing the incoming seaweed in i) is reused in i) when processing subsequently incoming seaweed and that for each section in ii) at least part of the used lye recovery solution obtained in one section is reused in the preceding section when processing subsequently incoming seaweed to compensate for the deficiency of the alkaline medium created in step i), and wherein the rest of said used lye recovery solution obtained in said one section is reused in the same section when processing the subsequently incoming seaweed, thus forming an upstream movement of the aqueous alkaline medium employed in the process and thereby enabling the recovery of said aqueous alkaline medium, and wherein means for reducing the volume of the upstream moving medium, such as evaporation means, optionally is provided.

Furthermore the present invention relates to a carrageenan product obtainable by this process.

An important feature of the present invention is that a deficiency of volume of the upstream moving medium is created. This is the case, when the seaweed is used in the reaction in a dry state. This dryness minimizes dilution of the aqueous alkaline reaction medium but on the other hand increases the swelling of the seaweed and thus absorption of liquid when contacted with the aqueous alkaline medium in the reaction step.

This swelling results in a deficiency, or loss of volume of aqueous alkaline medium in the reaction step, but this deficiency on the other hand renders it possible to replenish these up-stream parts with used lye recovery solution from the downstream lye recovery sections, thus forming an upstream movement of alkali and an overall recovery of alkali. It has been shown that the amount of alkali carried out of the system (the net loss) can be reduced by about 50% by the method of the present invention compared to the prior art method, a reduction which inter alia is very dependent on the incoming seaweed's residual moisture content which will reduce the size of the upstream current. Obviously, also reductions in water consumption are obtained in the process according to the present invention due to the upstream flow of liquids in the system. Another way to create a deficiency in the volume of the upstream moving medium is to provide means for reducing the volume of the upstream moving medium, such as evaporation means.

Another important feature of the present invention is the degree of swelling, or "swell factor", of the seaweed when being immersed in the aqueous medium in the reaction step and in the subsequent lye recovery sections. The swell factor is here defined as the wet (drained) weight of seaweed exiting the reaction divided by the weight as-is of the dry seaweed before entering into the reaction. The uptake of alkali solution from the reaction step, caused by this swelling and the ionic diffusion processes, will in general terms signify a loss of alkali which will never completely be counterbalanced by the recovery of alkali brought about by the upstream movement of alkali in the lye recovery sections. The swell factor is different from one seaweed to the other and is dependent on the content of residual moisture and residual salts in the seaweed as well as on the temperature of the liquid medium and its types and concentrations of solutes. Thus, the swelling factor for a seaweed decreases at increasing salt concentration of the medium and may decrease more strongly when the type of ion present in the medium is having moreover a specific carrageenan dissolution suppressing effect, like is most often the case for $K^+$-ions.

A bonus effect of the process according to the present invention is that not only the alkali, but also other ions, e.g. ions originating from the seaweed (in case of dry seaweed, partly due to the non-washing of the seaweed prior to the alkali modification step), will concentrate upstream in the process. In this context it should be mentioned that especially the presence of potassium ions in a moderate or high concentration in the liquids in the system is a very beneficial situation, as potassium ions are able to bind to the carrageenan polymers and form highly gelling and thus insoluble hydrocolloids. The concept of not washing the seaweed prior to the reaction step thus contributes to conserve seaweed-accompanying salts including potassium ions in the system.

However, also other ions than $K^+$ present in the unwashed seaweed will concentrate upstream in the system and these will also contribute to the non-dissolution of the carrageenans due to the higher salt concentration of the solutions in the respective sections thus obtained. Due to this salt concentration effect on the dissolution of carrageenans from the seaweed tissue, the specific need for an added $K^+$ dosage is much smaller or absent, and thus greater opportunities exist for cost-optimizing the $OH^-$ concentration individually. Accordingly it is found, that even employing other alkalis, such as NaOH in the reaction will most often render a heterogeneous process possible due to upstream concentration of dissolution suppressing ions.

In some cases it may even be advantageous to add salts to the liquids used in the reaction or the lye recovery sections in order to provide a further increased carrageenan-dissolution suppressing salt concentration to the system and to reduce the swelling of the seaweed in the section(s) in question. Such ions may comprise e.g. sulphates and chlorides of sodium, potassium and/or calcium.

A more detailed description of the idea of using other types of alkalis when conducting the alkali modification in the heterogenous process for the manufacture of gelling carrageenans is disclosed in Applicant's co-pending patent application No. WO03/059956.

BRIEF DESCRIPTION OF THE DRAWINGS

The invention is disclosed in more detail by reference to the drawings, wherein:

FIG. 1 represents a batch type process. In FIG. 1 (S) denotes the moving seaweed. (AM) represents the alkaline medium which is added to the reaction medium tank ($R_1$). The curved arrows represent the downstream path of the moving seaweed, and the upstream arrows represent the movement of the used liquid (UL) through the tank of the first lye recovery section ($L_1$) and the tank of the second lye recovery section ($L_2$). ($W_1$) denotes the tank of the washing section from which the seaweed finally exits. Liquid (L) is supplied to this washing section tank. Thus the process set-up of FIG. 1 comprises one reaction step, two lye recovery sections and one washing section.

FIG. 4 is a more detailed illustration of the process of FIG. 2. SW is a reactor containing the seaweed to be processed. $R_1$ is a tank containing the alkali to be used to modify the carrageenan precursor(s). This part of the process takes place in the Reaction Zone (RZ).

$L_1$-$L_n$ denote various tanks containing the liquids to be used in the lye recovery sections.

In this set-up a lye recovery section inter alia comprises a tank containing the lye recovery liquid and a number of conduits connecting the reaction tank to the tank of the section in question. The array of lye recovery sections thus make up the Lye Recovery Zone (LRZ).

The further conventional work-up, including the washing, takes place in the Further Work-Up Zone (FWZ).

Figure 4:
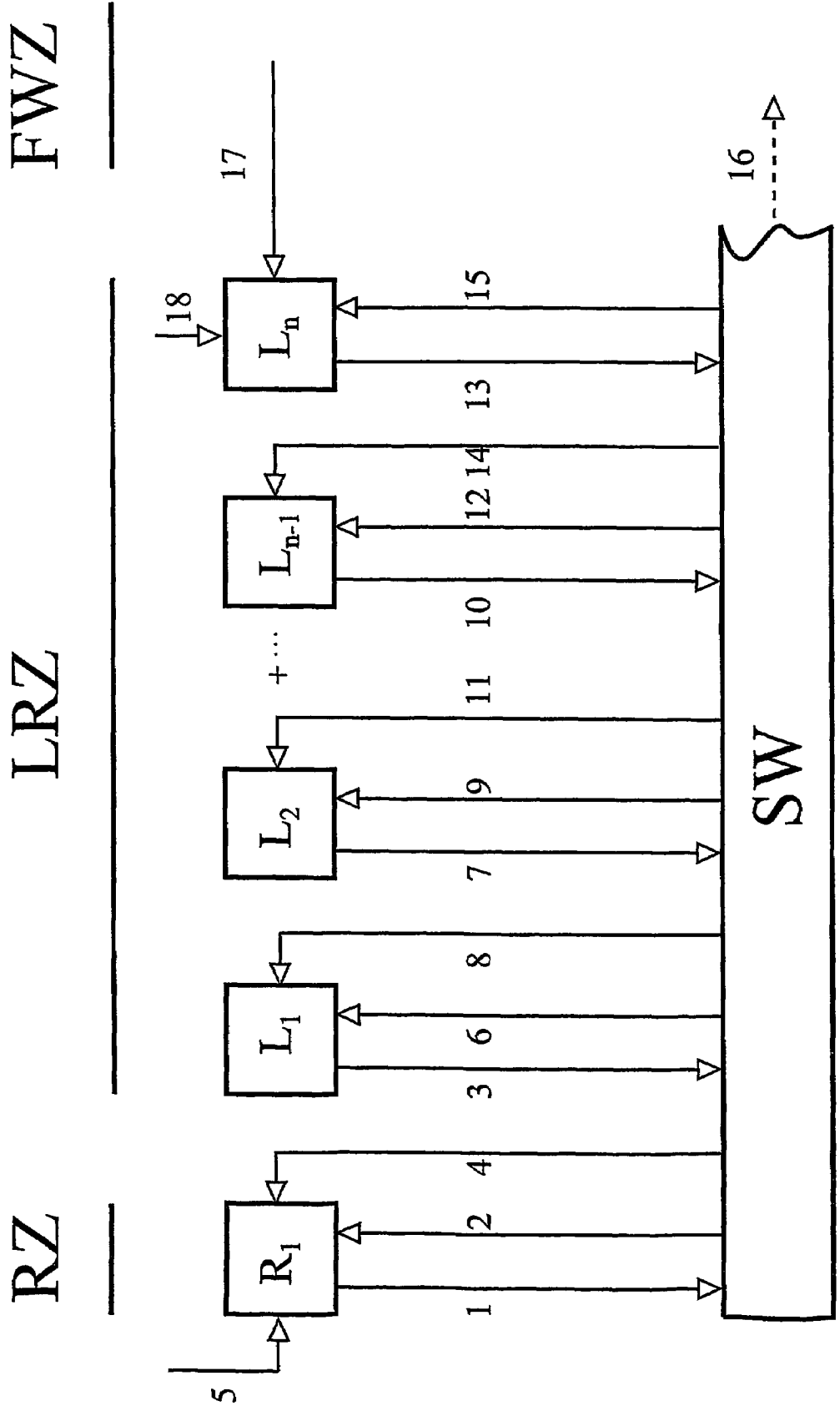
FIG. 4 is a flow chart of one way of carrying out the process according to the present invention. In the process set-up in FIG. 4 the seaweed is located in a stationary tank, and the liquids to be used in the various sections are transferred to and from this tank. The chronological order of the flows of liquid is denoted by arabic numbers. Thus
Figure 5A:
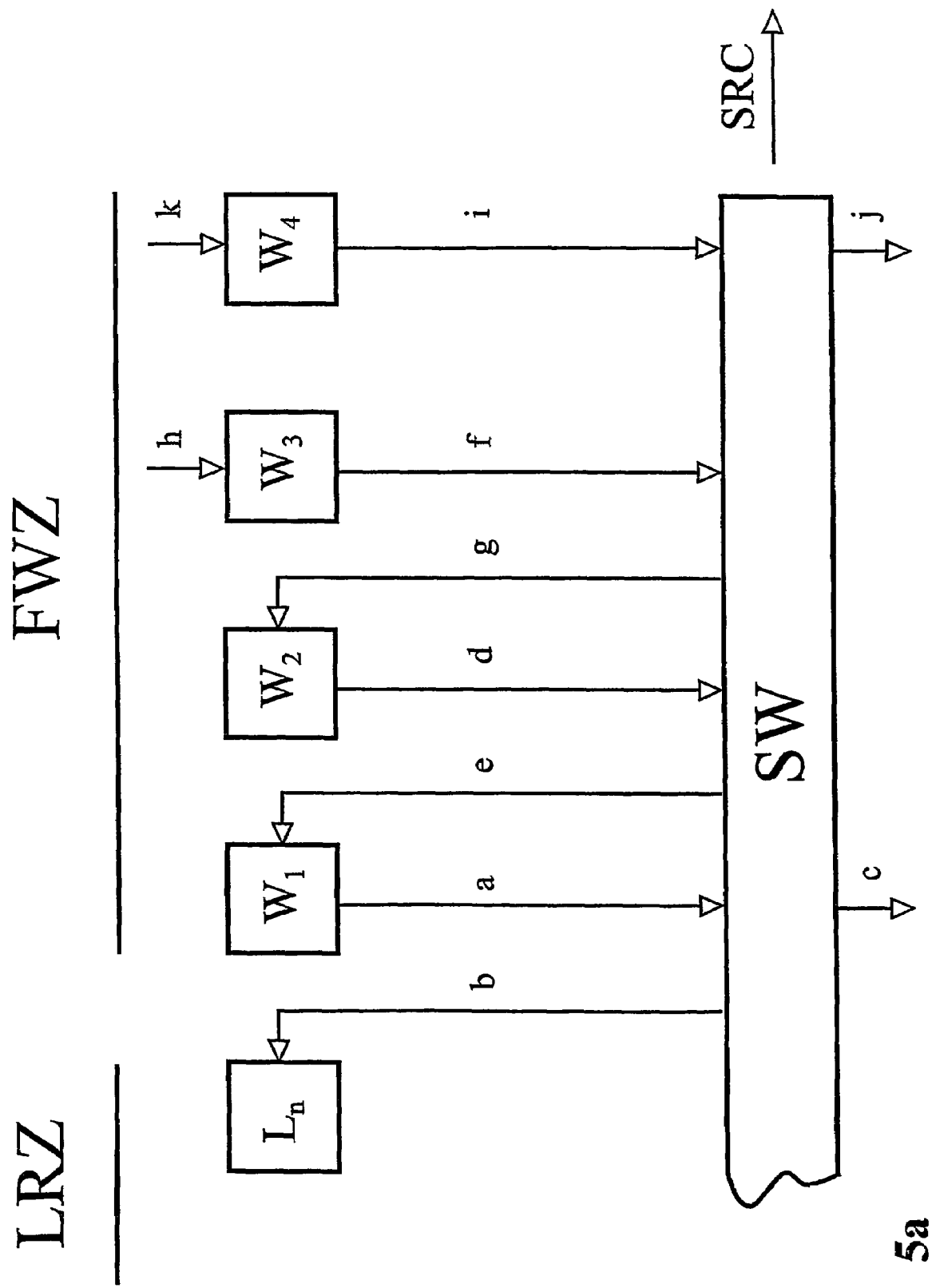
Figure 5B:
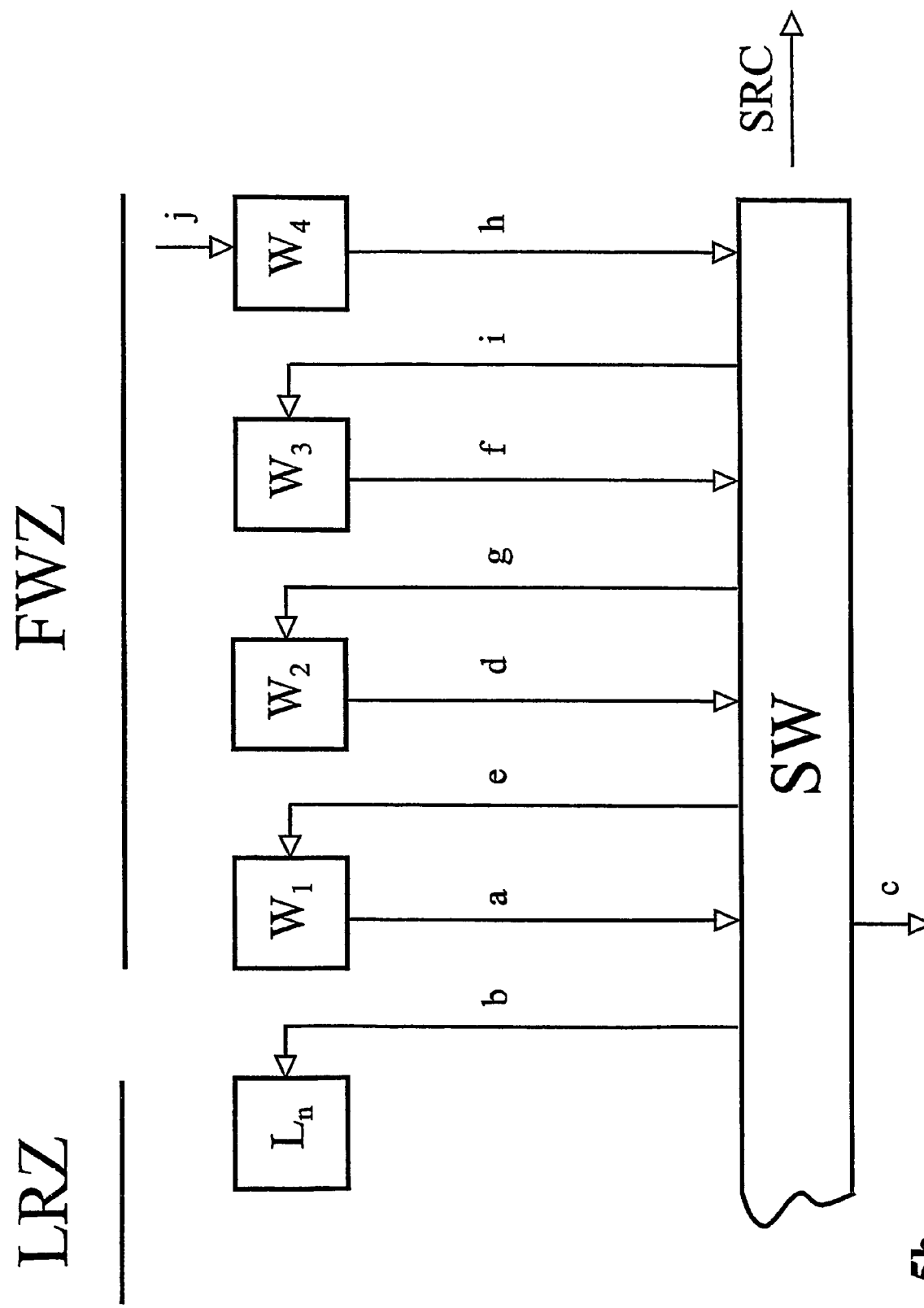
Figure 6:
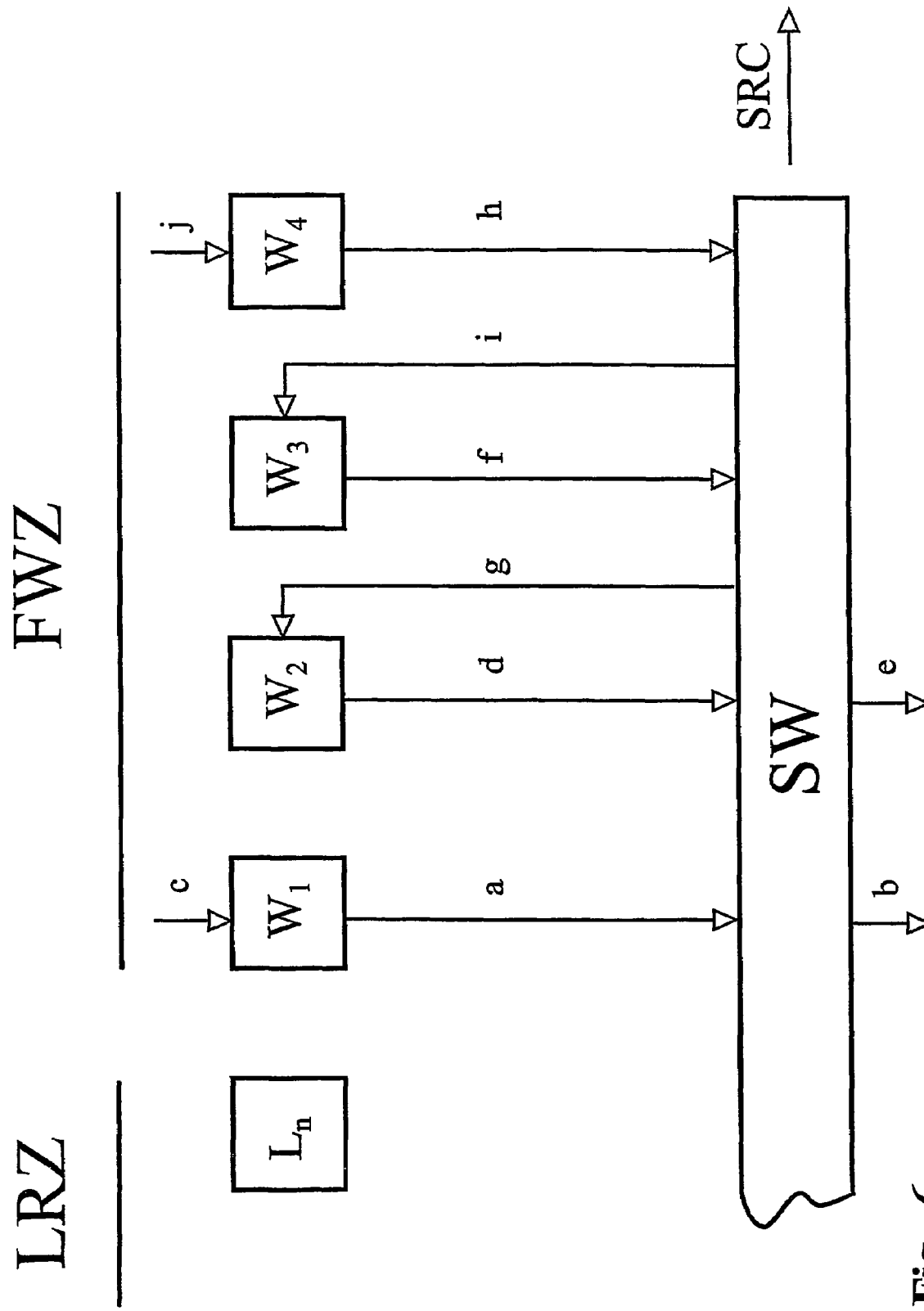

FIGS. 5a, 5b and 6 are flow charts of preferred modes for performing the further work-up of the seaweed after exiting the reaction step and the lye recovery sections according to FIG. 4. Also in FIGS. 5a, 5b and 6, the seaweed is located in a stationary reactor (SW) and the washing liquids to be used are transferred to and from this tank. Here, the chronological order of the flows is indicated by letters a, b, c, ... and so forth. FIGS. 5a, 5b and 6 depict the Further Work-up Zone including the last section of the Lye recovery Zone. In FIGS. 5a, 5b and 6 the washings are performed by means of four washing sections comprising four washing tanks $W_1$-$W_4$, containing the washing liquids. SRC denotes wet semi-refined carrageenan, which may be isolated after the washings. Thus the FWZ comprises an array of washing sections.

FIGS. 5a and 5b represent two preferred modes for performing the washing process for mono-component seaweed. Thus FIG. 5a represents three counter current washings and one cross current washing, whereas FIG. 5b represents four counter current washings.

FIG. 6 represents a preferred mode for performing the washing process for bi-component seaweed. Thus FIG. 6 represents one cross current washing and three counter current washings.

Figure 7:
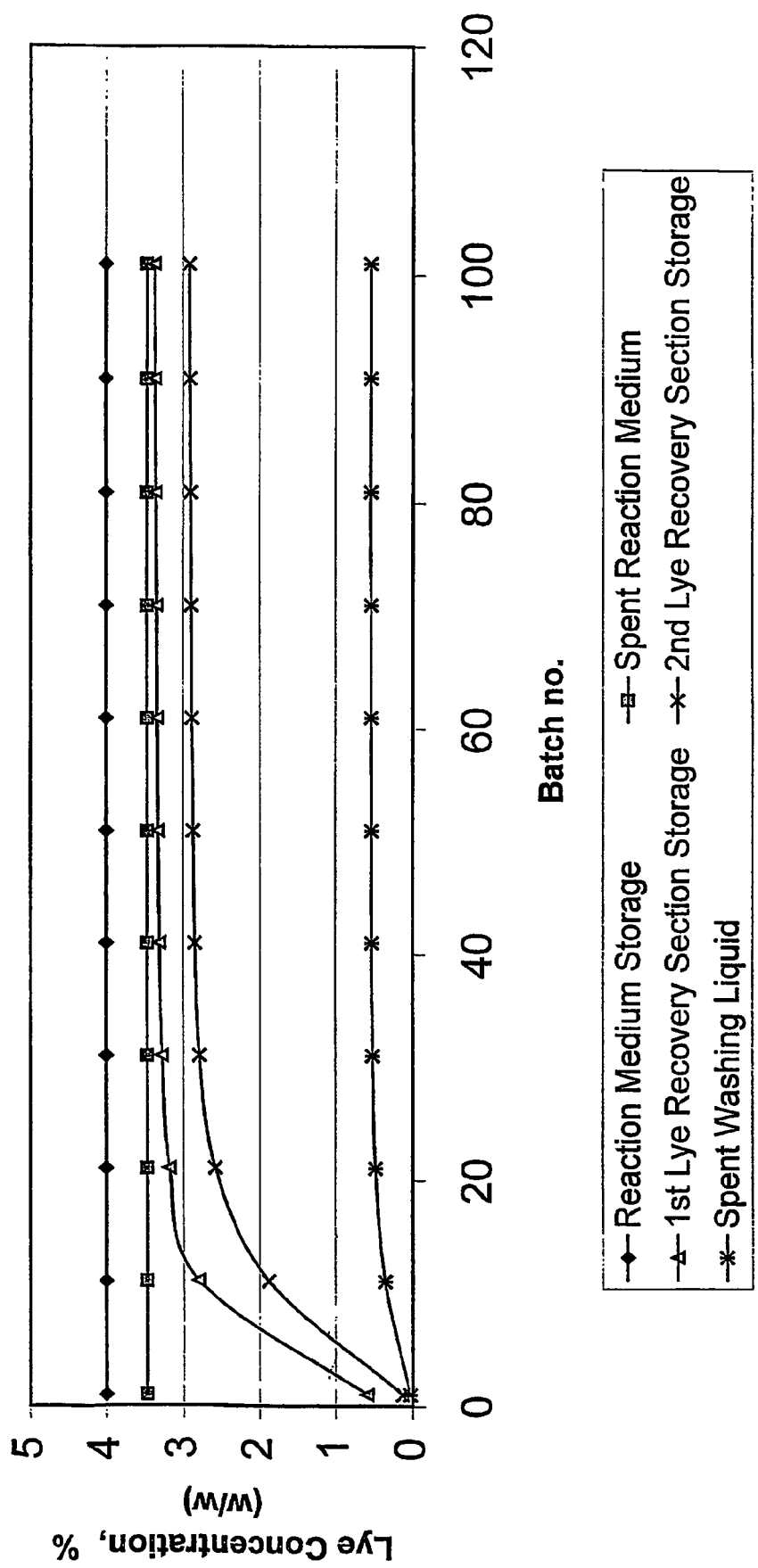

FIG. 7 are graphs showing the calculated alkali concentration of the liquids at various stages of the process as functions of number of batches processed.

Figure 8:
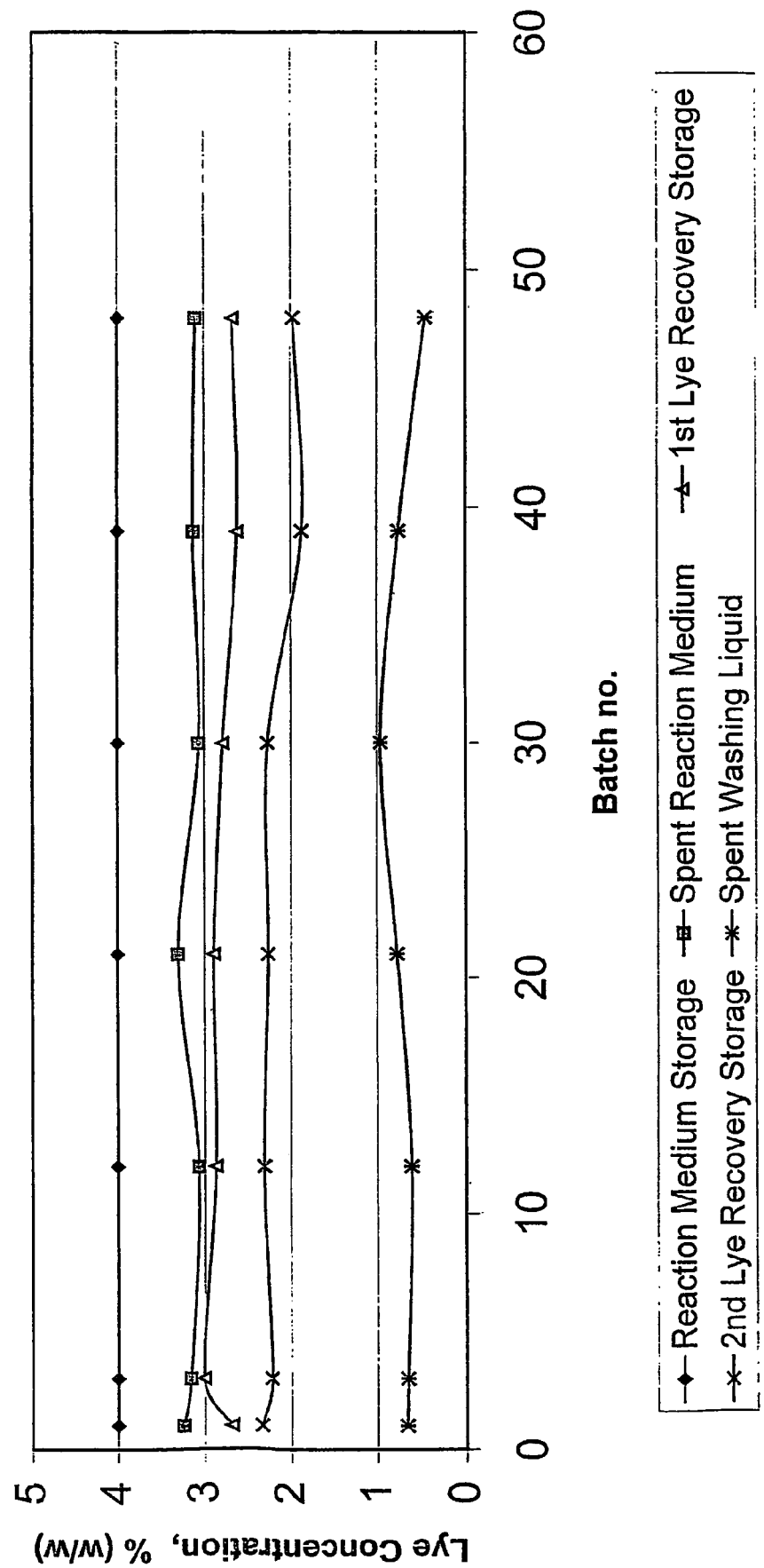

FIG. 8 are graphs showing the experimentally found alkali concentration of the liquids at various stages of the process as functions of number of batches processed.

FIG. 9 are graphs showing the calculated solute concentration of the liquids at various stages of the process as functions of number of batches processed. This solute concentration is computed as the Na-salt arising only from the neutralization of NaOH, and expressed as NaOH.

FIG. 10 are graphs showing the experimentally found density of the liquids at various stages of the process as functions of number of batches processed.

FIG. 11 are graphs showing the experimentally found dry matter content of the liquids at various stages of the process as functions of number of batches processed.

The extent of applicability of the invention appears from the following detailed description. It should, however, be understood that the detailed description and the specific examples are merely included to illustrate the preferred embodiments, and that various alterations and modifications within the scope of protection will be obvious to persons skilled in the art on the basis of the detailed description.

BEST MODE FOR CARRYING OUT THE INVENTION

Figure 1:
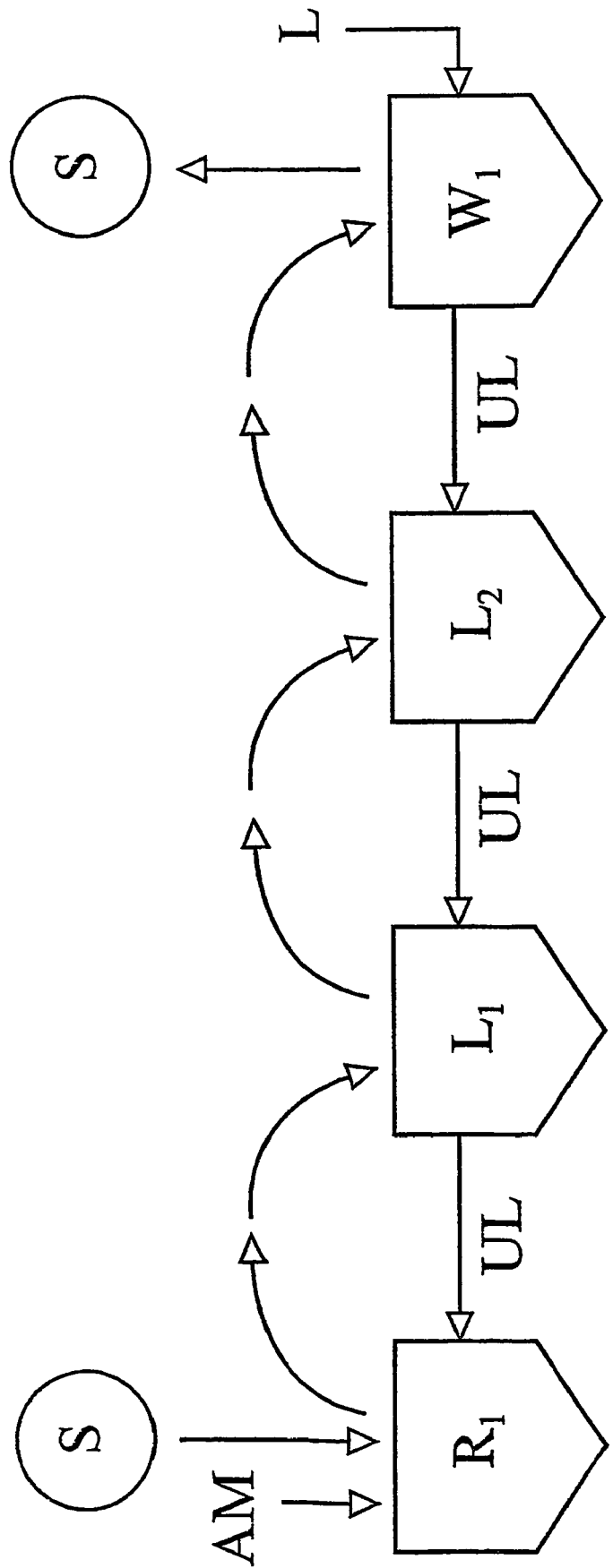
FIG. 1 depicts an outline of one example of a process set-up according to the present invention. In this process set-up the seaweed is moved from tank to tank each containing the liquid with which the seaweed is to be contacted. Accordingly
Figure 3:
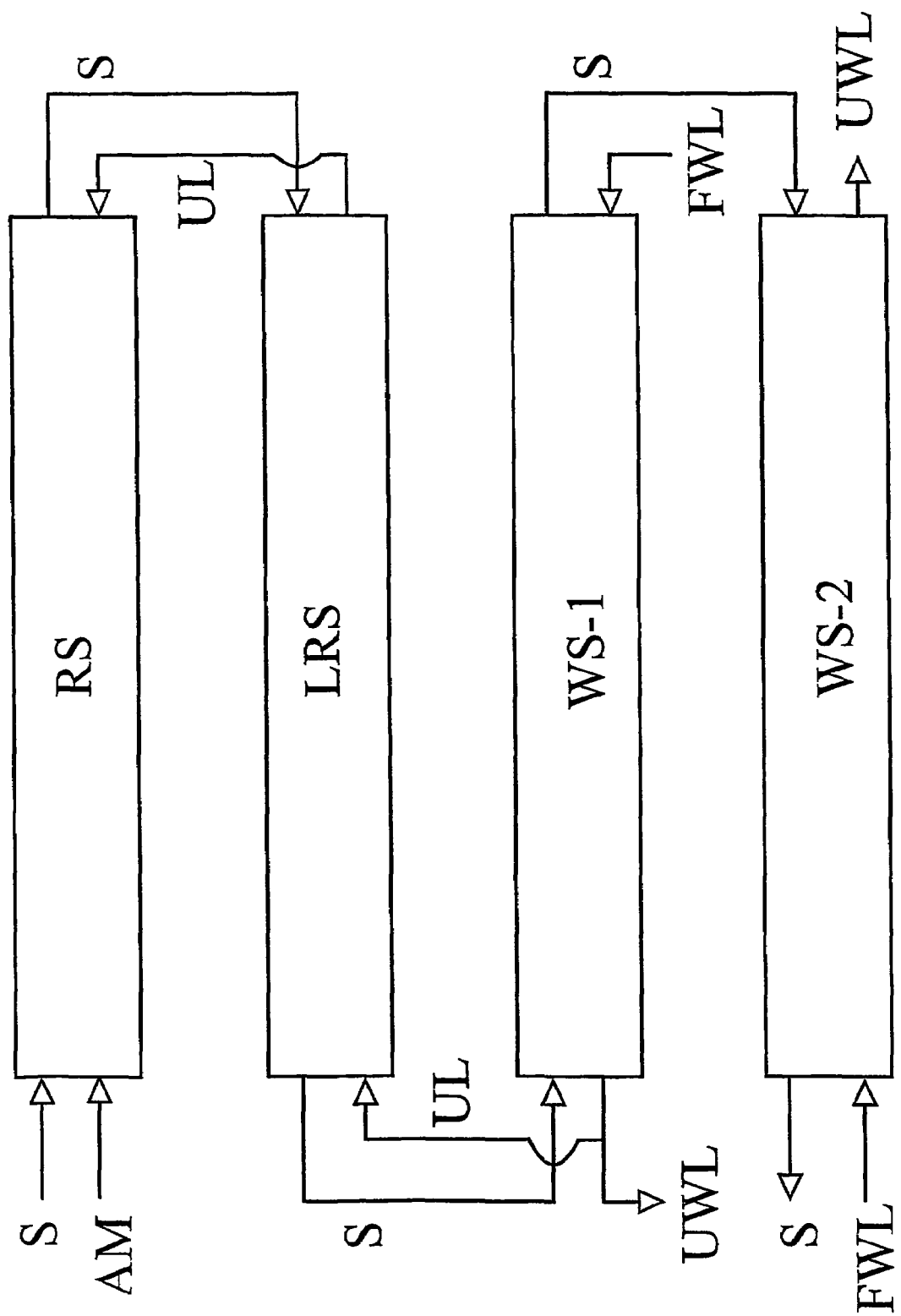
FIG. 3 depicts an outline of yet another example of a process set-up according to the present invention. In this process set-up, the seaweed is processed in a continuous manner. This set-up comprises a reaction section, a number of lye recovery sections and two separated washing sections. Thus the seaweed (S) enters the reaction section (RS) and is moved through the lye recovery sections (LRS) through the first and second washing sections (WS-1) and (WS-2) in one direction, while the liquid phase is transferred in the opposite direction. In the second washing section (WS-2) fresh washing liquid (FWL) is supplied. This is discarded later as used washing liquid (UWL) and thus is not participating in the up-stream movement of liquid. In the first washing section fresh washing liquid (FWL) is supplied again, and some of this participates in the upstream movement of used liquid (UL), while another part is discarded as used washing liquid (UWL), as denoted by the arrows.

The invention will now be explained in general terms with reference to FIG. 4. In FIG. 4 a batch-type process scheme is outlined, in which the seaweed is located in a stationary tank equipped with suitable agitation means and the liquids with which the seaweed is to be treated are transferred back and forth to this tank. FIG. 4 merely serves to explain the order of steps in the reaction and the lye recovery procedures, respectively and also to explain how the liquids in the individual sections can be reused in order to obtain reductions in the amount of alkali employed. Thus a person skilled in the art will know how to adapt the process set-up as explained in FIG. 4 to other types of set-ups, e.g. to a process set-up in which the seaweed is not stationary, but moved from one tank to another (as depicted in FIG. 1) or to a continues type of process, wherein the seaweed and the liquid are brought to move counter-currently by other means (as depicted in FIG. 3). Such a counter current process set-up may for each of its counter current sections e.g. comprise a perforated helical conveyor rotating in order to impart movement of the seaweed in one direction, in combination with a counter directional liquid current, and optional zones within the section where additional mechanical agitation and liquid movement are provided in order to improve the reaction or the washing taking place. In such a set-up, the counter current may e.g. be provided for by establishing a difference in liquid level between the two ends of the conveyor. A solid/liquid separation step will be needed when transmitting from one section to the other.

It should be stressed that terms such as: "aqueous medium", "aqueous solution" and "aqueous liquid" in the present application comprises a liquid substance comprising water, and it may thus also comprise some amounts of other solvents, such as alcohols. The amount of other solvents than water, such as alcohol on a weight/weight basis may amount to 0-50%, such as 0-20%, eg. 0-10% or 0-5%.

The process set-up of FIG. 4 comprises three zones; a Reaction Zone (RZ), a Lye Recovery Zone (LRZ) comprising the lye recovery sections and finally a Further Work-Up Zone (FWZ) comprising the washing sections. The two former zones comprise a number of tanks containing the liquids to be used. In FIG. 4 the arrows and the accompanying numbers of the arrows indicate the direction and chronological order of the flows of the process. Preferably the seaweed and the liquid is agitated in each section in order to obtain thorough and efficient reaction/extraction.

The tanks in each section should have a size and a content that are sufficient for conducting the procedures in each section efficiently. Thus, tanks having a volume that is not sufficient to contain the amount of liquid necessary in each section should be avoided. On the other hand the tanks may very well each have a volume that are several times larger than the volume of the seaweed tank. This latter situation may be utilized when more than one seaweed tank are coupled to the tanks of the Reaction Zone and the Lye Recovery Zone, respectively. In this way several batches may be processed at the same time in different seaweed reactors all sharing the same supply of liquids from the above mentioned tanks.

Reaction Zone

In the Reaction Zone an aqueous alkaline medium situated in the reaction medium tank ($R_1$) having a specified alkali concentration is transferred to the seaweed tank (SW) as indicated by the arrow (1) and the reaction is carried out on the seaweed for a time sufficient to modify the carrageenan to a desirable extent. Thereafter the used liquid is transferred back to the tank ($R_1$) as indicated by the arrow (2).

Lye Recovery Zone

In FIG. 4 the Lye Recovery Zone comprises a number of tanks. A single section in the Lye Recovery Zone is also possible, but generally 2, 3 or 4 sections will usually be employed to provide for a sufficient recovery of the alkali employed in the Reaction Zone. In a start-up situation the liquids to be used in the tanks of the Lye Recovery Zone—in this application referred to as lye recovery solutions—may contain only water. After processing a certain amount of seaweed, i.e. after running a number of batches, a steady state situation will be approached, wherein each tank will contain a lye recovery solution having a concentration of alkali and other solutes which is less than in the liquid in the previous tank. Alternatively, in the start-up situation the tanks may already be prepared with this stepwise decreasing alkalinity and stepwise decreasing concentration of other solutes.

In the Lye Recovery Zone lye recovery solution is supplied from ($L_1$) to the seaweed tank (SW) as denoted by the arrow (3). The seaweed is processed for a suitable time. Because the seaweed in the reaction step has absorbed some of the alkaline solution fed to the seaweed by (1) the amount of alkali in ($R_1$) is less than originally. Thus, ($R_1$) is fed with the used lye recovery solution from the first lye recovery section in order to make up the original amount of alkali in ($R_1$) as indicated by the arrow (4). After this, the alkali strength in ($R_1$) is adjusted to the original value by adding alkali as indicated by (5) (obviously, this adjustment does not have to take place at this particular point, but the adjustment has to be carried out before running the batch to come). The rest of the used lye recovery solution from the first lye recovery section is then recycled from the seaweed tank (SW) back to ($L_1$) as indicated by the arrow (6).

In the next section in the Lye Recovery Zone, lye recovery solution is supplied from $L_2$) to the seaweed tank (SW) as indicated by the arrow (7). After processing for a suitable time the amount of lye recovery solution in ($L_1$) is then made up to its original value by feeding the used lye recovery solution from the second lye recovery section to ($L_1$) as indicated by the arrow (8). The rest of the used lye recovery solution from the second lye recovery section is then recycled to ($L_2$) as indicated by the arrow (9).

Repeated cycles of these lye recovery sections can be performed in a similar way, where part of the used lye recovery solution in a lye recovery section is transferred to the tank from which the lye recovery solution from the previous section originates, and where the rest of the used lye recovery solution in said lye recovery section is recycled to the tank from which it originates. This is indicated by the arrows (10), (11) and (12) for the n-l'th lye recovery section. As noted above, 2, 3 or 4 lye recovery sections will normally suffice. However, even only 1 lye recovery section as well as 5, 6 or more sections are contemplated.

Thus, in the last section in the Lye Recovery Zone, lye recovery solution is transferred to the seaweed tank (SW) from the last lye recovery tank ($L_n$) as indicated by the arrow (13) and after a suitable process time, the used lye recovery solution is then used for making up the level of the previous tank ($L_{n-1}$) as indicated by the arrow (14). The rest of the used lye recovery solution from the n'th lye recovery section is then recycled to ($L_n$) as indicated by the arrow (15). The amount of lye recovery solution in ($L_n$) is then made up to its original value from an outside source of liquid as described below.

If, in the start-up situation the tanks in the Lye Recovery Zone contained water these will now contain a alkaline solution each having a weaker alkalinity than the preceding tank. When a number of batches have been processed a steady state will be approached in which the alkalinity in each lye recovery tank essentially remains constant during the continued processing of further batches. This steady state situation will also arise if the tanks have been preadjusted with successively decreasing basicities.

Further Work-Up Zone

After the last lye recovery section the seaweed may be further processed according to prior art methods. This work-up is carried out in the Further Work-Up Zone as indicated by the broken arrow (16).

Thus, as the treated seaweed comes out from the lye recovery zone, as indicated by the broken arrow (16), most often heterogeneous washing cycles are performed.

If this is the case the washing liquid from the Further Work-Up Zone may be recycled to ($L_n$) in the last lye recovery section as denoted by (17). Otherwise, the last lye recovery tank ($L_n$) may be replenished to its original volume by liquid of other origin, e.g. water, as denoted by (18).

In the Washing Zone any kind of suitable mode of washing may be performed. However, also more sophisticated approaches for washing strategies may be employed. Thus, cross current and counter current flow techniques are contemplated as well. The mode of washing to be chosen may inter alia depend of the type of seaweed (mono- or bicomponent) to be processed. Thus, when processing monocomponent seaweed a series of three counter current washings and one cross current washing, two times two counter current washings, or four counter current washings may advantageously be employed. This mode of washing will provide for further recovery of residual alkali from the seaweed and economize washing liquid consumption. When processing bicomponent seaweed, on the other hand, a series of one or more cross current washings and three counter current washings may be advantageous. The reason for such a wash combination would be to distribute the "λ-family" carrageenans, becoming extracted here, more equally and into a suitable total volume of washing liquid, considering the viscosity imparted by the λ-family carrageenan substances.

FIG. 5a represents a preferred mode of carrying out the washings for mono-component seaweed. Thus, after the last lye recovery section, the seaweed is supplied with washing liquid from the tank ($W_1$) containing washing liquid which has already been used as washing liquid twice. This is denoted by the arrow (a). After washing for a suitable time, the last lye recovery tank ($L_n$) in the Lye Recovery Zone, is replenished with this used washing liquid as indicated by the arrow (b). This flow of liquid thus corresponds to the arrow (17) in FIG. 4. The rest of the used washing liquid is discarded as indicated by the arrow (c). Then the seaweed is supplied with washing liquid from the tank ($W_2$) containing washing liquid that has been used once before. This transfer of liquid is denoted by the arrow (d). After washing the seaweed for a suitable time, the washing liquid is transferred to the tank ($W_1$) as indicated by the arrow (e). Hereafter washing liquid is transferred from the tank ($W_3$) to the seaweed as denoted by the arrow (f) and after washing for a suitable time the tank ($W_2$) is replenished with this used washing liquid as indicated by the arrow (g). Then the tank ($W_3$) is replenished with either water or other convenient fresh wash liquid as indicated by the arrow (h). In the last washing section washing liquid is supplied to the seaweed from the tank ($W_4$) containing water or other convenient fresh wash liquid as indicated by the arrow (i). After washing the used washing liquid is discarded as indicated by the arrow (j) and the tank ($W_4$) is replenished with either water or other convenient fresh wash liquid as indicated by the arrow (k).

FIG. 5b represents yet another preferred mode for carrying out the washings for mono-component seaweed. The only difference between FIG. 5a and FIG. 5b is that in FIG. 5b the washing liquid from the last washing section (i.e. the liquid from $W_4$) is transferred to the tank ($W_3$) instead of being discarded. Thus, FIG. 5b depicts four counter current washings instead of three counter current washings and one cross current washing as in FIG. 5a. FIG. 5b should be self-explanatory on the basis of the above section.

FIG. 6 represents a preferred mode for carrying out the washings for bi-component seaweed. Thus, after the last lye recovery section, the seaweed is supplied with washing liquid from the tank ($W_1$) containing fresh washing liquid. This is indicated by the arrow (a). After washing the seaweed this liquid is then removed from the seaweed tank (SW) as denoted by the arrow (b), and this removed liquid may be further processed in a separate plant for recovery of λ-carrageenan (this may e.g. be done by filtration of the extract and precipitation with iso-propanol). Hereafter new washing liquid is transferred to the tank ($W_1$) as indicated by the arrow (c). This washing liquid may either be water or other convenient fresh wash liquid. Then the seaweed tank (SW) is supplied with washing liquid from the tank ($W_2$) containing washing liquid which has already been used twice as denoted by the arrow (d). After washing the seaweed this liquid is removed from the seaweed tank (SW) as denoted by the arrow (e). Again, this removed liquid may be further processed in a separate plant for recovery of λ-carrageenan. New washing liquid is then transferred to the seaweed in (SW) from the tank ($W_3$) as denoted by the arrow (f). This washing liquid has already been used once before. After washing the seaweed the used washing liquid is transferred to the tank ($W_2$) as denoted by the arrow (g) and the seaweed tank (SW) is then supplied with fresh washing liquid from the tank ($W_4$) as denoted by the arrow (h). After washing the seaweed this liquid is then transferred to the tank ($W_3$) as denoted by the arrow (i) and the tank ($W_4$) is replenished with washing liquid as denoted by the arrow (j). This washing liquid may be either water or other convenient fresh wash liquid. It is seen from FIG. 6 that no transfer of liquid from the Further Work-up Zone to the Lye Recovery Zone takes place. For a more detailed description of a method for the heterogenous processing of bi-component seaweed, see Applicant's application No. WO 03/059955.

It should be stressed that the above procedures for performing the washing procedure are preferred modes. However many other ways for carrying out this washing procedure are possible. A person skilled in the art will know how to conduct such washing procedures.

After exiting the last washing section the solid remaining seaweed may be recovered and optionally further worked up in a manner known per se. Thus, the manufacture of SRC as well as RC types of carrageenan products are possible in the process according to the present invention.

This implicitly makes it possible to produce, at a low cost, a so called semi-refined carrageenan (SRC) which has never been dissolved (extracted) from the seaweed. However, also in the case of wishing to produce a refined carrageenan (RC) it provides a simple means of eliminating a very large part of the insoluble residues (sand etc.) and of the soluble non-carrageenan residues (salts, sugars, etc.) before the final refining of the SRC-intermediate by extraction. This mentioned early elimination of residues will be desirable because it will result in less load on the demanding solid/liquid separation steps for the viscous carrageenan extract solution prior to precipitation, and it will signify less residuals in the final refined carrageenan.

One method for the manufacture of refined carrageenan (RC) might be to conduct a traditional refining by extraction, i.e. to add water to the seaweed, neutralize by means of acid in order to obtain a suitable pH and thereafter heat up to dissolve the carrageenan contained in the seaweed, remove seaweed residues by suitable solid/liquid separation, precipitate the carrageenan selectively by e.g. isopropanol, dewater the precipitate, dry and grind. For a more detailed description of the final processing reference is made to U.S. Pat. No. 5,801,240.

The lambda-containing washing liquids may be also be worked up in order to obtain a RC lambda product. This can be done by heating the extract and filtering through eg. a Perlite filter aid under vacuum. After filtration the filtrate volume may be reduced by use of evaporation. The solution may then after cooling be subjected to a precipitation with iso-propanol. Then the fibrous material can be separated and pressed, dried and grinded to the lambda-RC product.

The previous sections have primarily focused on the chronological order of the flows of liquids according to the process of the present invention as represented by FIG. 4. The following sections will focus more detailed on the various conditions of the Reaction Zone, the Lye Recovery Zone and the Further Work-Up Zone respectively according to the process of the present invention with particular reference to the conditions of the preferred embodiment of the invention, viz. FIG. 4-6. This should not be interpreted to preclude the implementation of the principles in the alternative modes of executing the process according to the present invention. A common feature for all possible process set-ups according to the process of the present invention is that the amount of liquid transferred from one section to the preceding section or step is adapted so as to compensate for the lost volume of liquid in said preceding section or step, partly due to differences in the seaweed's content of liquid between said one section and its corresponding preceding section or step and/or due to the fact that means for reducing the volume of the upstream moving medium is provided. Optionally the amount of this compensation may be reduced in case of adding liquid of other origin, such as when adding fresh alkali for use in the alkali modification.

The Heterogenous Reaction

The purpose of the heterogeneous reaction step is to convert to the desired extent, the gelling carrageenan precursor(s) to gelling carrageenan(s). This is done by alkali modification of the precursor(s). Based on literature findings (see e.g. Ciancia et al., Carbohydrate Polymers, 20 (1993), pp. 95-98), we may assume that the homogeneous alkali modification reaction of carrageenans follows overall 2nd order reaction kinetics. If we assume something similar for the heterogeneous reaction, we get:

$$-r_A = k_A * C_A * C_B$$

wherein $r_A$=the rate of reaction of reactant A (=precursor)

k=rate constant, a function of temperature $C_A$=concentration of reactant A (=precursor)

$C_B$=concentration of reactant B (=hydroxyl ions)

This illustrates the practical experience that a certain extent of modification of any one precursor carrageenan type may be obtained by a number of different combinations of temperature and alkali strength. In the preferred embodiment of the invention, the sequence of events will be as follows:

The precursor-containing seaweed reactant is available in a relatively dry form. Dry matter contents of from 45 to 90% is normal. The higher the dry matter content of the seaweed is prior to entering the reaction, the higher will be the obtainable lye recovery in a given set-up of the process according to the invention.

According to the present invention it is preferred to use dry seaweed, although the seaweed may also be introduced in the reaction in a wet state, provided that other means for reducing the volume of the upstream moving medium, such as evaporation means, is provided.

The alkali reactant is available as a solution, maintained at a defined alkali strength and temperature and stored in a tank. The type of alkali may preferably be KOH, NaOH, $K_2CO_3$, $Na_2CO_3$, $K_3PO_4 Na_3PO_4$ or ammonia, but in principle any alkali will work. If KOH is used as the alkali the concentration $C_B$ of the alkali may be within the range 0%<$C_B$<16% (w/v), preferably 0.05% (w/v)<$C_B$<12% (w/v), most preferred 0.1% (W/V)<$C_B$<8% (w/v). If another alkali is used the concentration of this alkali should be adjusted so as to obtain a solution having a modification power corresponding to the modification power of the KOH solution having a concentration within the above ranges. The concentration necessary for other alkalis maybe found by simple experimentation.

The temperature of the alkali solution may range from 5 to 95° C. When KOH is used as the alkali a temperature of 55-80° C., most preferred 55-75° C. may be applied The seaweed reactant and the alkali reactant are transferred to the reactor. In the course of the reaction, the temperature and the alkali strength are maintained at the desired levels, or optionally, the alkali strength in the reactor is not maintained, in which case the alkali strength (and the reaction rate) will gradually decrease as a result of the reaction and dilution taking place. The duration of the reaction is chosen to suit practical circumstances, and may accordingly range between 0.5 hour and 5 hours, preferably between 1 hour and 3 hours.

When a high extent of reaction (carrageenan modification) is desired, a combination of process parameter values is normally chosen which gives a high reaction rate: high alkali strength during the whole reaction time, high temperature. E.g. >4% (w/v) KOH, 75° C., 3 hours. A high extent of carrageenan modification will result in a carrageenan with high gel strength.

When a low extent of reaction (carrageenan modification) is desired, a combination of process parameter values is normally chosen which gives a low reaction rate: low initial and (more importantly) low final alkali strength, temperature and time may also be reduced if needed. E.g. <3% (w/v) KOH, 60° C., 2 hours. A low extent of carrageenan modification will result in a carrageenan with low gel strength but possibly with less water exudation or syneresis, suitable for making gels with increased spreadability and increased creamy mouthfeel. In the present application, also these carrageenans are classified "gelling carrageenans".

The alkali consumption may in principle be split into two parts; part 1: consumption due to neutralization of liberated sulphuric groups from the carrageenans and hydrolysis of other organic material in the seaweed, and part 2: washing loss, ie. the residual alkali carried out of the lye recovery zone by the swollen treated seaweed. Part 1 above contributes normally to the greatest amount of alkali consumption.

After the reaction the used alkaline solution is transferred back to the tank from which it originates, and because the seaweed has absorbed part of the solution and because the alkali concentration of the used alkali after the reaction is less than originally due to consumption of the alkali by the seaweed as well as dilution caused by the residual moisture of the incoming seaweed, the amount of alkaline solution in the tank must be replenished to its original volume and to its original alkali strength by means of adding batchwise lye recovery solution to the tank and adding later new alkali so as to obtain the original alkali strength. In a preferred process set-up, the used alkaline solution obtained after the reaction as well as the used alkaline solution obtained after the first lye recovery section may be transferred to a buffer tank. The content of this buffer tank may accordingly be fed to the tank containing the aqueous alkaline reaction medium.

The amount of alkali solution, which is absorbed, depends on the dry matter of the seaweed. The drier the seaweed is the more alkali solution will be absorbed. However, this absorbed alkali will be recovered to a high degree once entering the Lye Recovery Zone. What becomes more important for the process economy, is that dry seaweed provides minimum additional water that will add volume to the alkaline liquid of the reaction step and, thereby, reduce the possible liquid replenishment from the Lye Recovery Zone. High moisture in incoming seaweed to the reaction step may, however at a cost, be compensated by selective removal of water from the reaction step, e.g. by inserting means for reducing the volume of the upstream moving medium, such as evaporation means.

The optional buffer tank for used lye from which the alkali originates may be equipped with an auto-titrator, which will compute the amount of spent alkali. However, before or while the alkali solution is brought back to its original strength, the volume which is absorbed by the seaweed gets replenished. This replenishing is accomplished by adding the used lye recovery solution which is obtained from the first lye recovery section.

The Lye Recovery Sections

The purpose of the lye recovery sections of the process according to the present invention is to recover and reuse part of the alkaline solution employed in the reaction. This is done by reusing the used lye recovery solution from one section in the preceding section when processing subsequently incoming seaweed. In the process of the present invention one or more lye recovery sections are contemplated. As stated above, the tanks of each lye recovery section may in the start-up situation contain water, if there is no risk of carrageenan dissolution.

Due to the fact that the solubility of carrageenans increases with decreasing alkalinity, decreasing salt concentration and increasing temperature, the lye recovery solution in each tank in the Lye Recovery Zone should have a temperature that is sufficiently low in order to avoid the dissolution of the carrageenans.

The temperature range of the liquids of the lye recovery sections may preferably be 10 to 60° C., or more preferably 20 to 40° C.

The Washing Sections

The specific modes of washing are described in detail above. The washing liquid is typically water. However if it appears that the liquids employed in the various sections of the process have a relatively high content of sodium ions, and if water is used as washing liquid, the gelling carrageenan end product of the inventive method, i.e. the semirefined carrageenan (SRC) or the refined carrageenan (RC) may be a carrageenan polymer having to a very large extent sodium ions as counter ions to the sulphate groups. These types of carrageenans may for some purposes be less desirable due to their gelling characteristics. Thus, in such situations it is desirable to perform an ion exchange before obtaining the end product. Such an ion exchange is typically performed with a potassium salt, such as e.g. KCl or $K_2SO_4$, if the gelling carrageenan is kappa-carrageenan in order to obtain an end product having to a very high extent potassium ions as counter ions to the polymer sulphate groups. If, on the other hand, the gelling carrageenan is iota-carrageenan it is often desirable to perform an ion exchange with a calcium salt, such as $CaCl_2$ in order to obtain an end product having to a very high extent calcium ions as counter ions to the polymer sulphate groups.

In the event ion exchange is contemplated, the washing liquid in at least one of the washing steps may in a preferred embodiment contain the ions needed for the ion exchange. Thus, one or more of the tanks containing the washing liquid may comprise a potassium or a calcium salt in solution. The concentration of such an ion exchange salt may be within the range of 0.1 to 10% (w/v).

Sometimes it may be desirable to make sure that all alkali has been eliminated before the alkali treated seaweed is further processed into the carrageenan product(s). This may be done by treating the seaweed with a weak acidic solution in one of the washing steps, preferably the last washing step.

Sometimes it may be desirable to bleach the seaweed before further processing. This may be done by adding an oxidizing agent, e.g. a hypochlorite or hydrogen peroxide to the wash solution, preferably in the last washing step.

The temperature of the washing liquid depends of the type of seaweed source. Generally a temperature in the range of 5-70° C., normally in the range of 10-50° C. is employed. However, a too high temperature that may result in solubilizing the gelling carrageenans should be avoided.

EXAMPLES

Determining Gelling Performance

In the subsequent examples the following performance grading method was used in order to determine the gelling performances of the obtained products.

The "grading methods" build on the principle that the grade value is proportional to the value of the functional performance of the product in the medium. Within every method we have to define one exact product sample as being the standard, having a grade strength=100° (or other number, for that matter).

Consequently, if a new sample shows a grade strength of 50°, one needs double dosage in the medium to obtain the same performance as of the standard, i.e. the (commercial) value of the 50° sample is 50% of the value of the 100° sample.

In each of the performance grading methods as described below, measurements are made of the functional effect (e.g. gel strength or viscosity) at certain concentrations of sample (SRC or RC). These concentrations of sample ("target sample concentrations") are chosen empirically to give strengths close to a defined target whereby the "grades" may be calculated by intrapolation or extrapolation. The grade value is in principle inversely proportional to the needed sample concentration for giving a target functional effect in the medium and is defined in relation to a standard having a defined grade number, as mentioned above.

The "grades" may be obtained, on a sample dry matter basis, by multiplying by the term: 100/(% D.M. in powder). D.M. (dry matter) being determined by drying the product in a drying cabinet for four hours at 105° C., weighing before and after.

Milk Gel strengths, ° MIG-R and ° MIG-B

This method is intended to reflect the product's gelling performance in milk dessert products and serves to calculate the grade strengths: ° MIG-R (milk gel rigidity grade at 2 mm deformation) and ° MIG-B (milk gel grade at break point).

Determination of Target Sample Concentrations

If the sample is expected to perform at for instance X ° MIG-R, the amount in grams of sample powder, Y, to be used in the procedure below will be Y=1.00 g*(100/X). Thus, if for instance X=100° MIG-R, the powder amount should be 1.00 g and if for instance X=50° MIG-R, the powder amount should be 2.00 g. Two different sample concentrations $Y_1$ and $Y_2$ are chosen based on this, both close to the found value of Y, in order to enable a suitable intra- or extrapolation. Thus, the procedure described below will be performed for each sample concentration individually.

The product sample standard for this method is: *GENU-LACTA* Carrageenan P-100-J, lot no. 02 860-0 which is rated at 101° MIG-R (determined at a target R value of 40.0 g) and 114° MIG-B (determined at a target B value of 100 g). To be able to calculate the "grades" of the sample in relation to this standard, the procedure described below must be performed for two different sample concentrations individually, also for this standard sample.

Milk Gel Preparation 50.0 g of skim milk powder (MILEX 240, MD Foods Ingredients amba) and $Y_n$ g sample ($Y_n$=a target concentration, to be determined as described above) are placed in a tarred 1 liter glass beaker and the powders mixed with a spatula. 450 g of de-ionized water is added to the beaker under stirring. The mixture is heated to 68° C. in a water bath and kept at this temperature for 5 minutes while maintaining stirring. The contents of the beaker are then made up to a total weight of 500.0 g by means of adding de-ionized water and stirring to mix. The solution is then poured into two crystallization dishes (diam. 70 mm, height 40 mm, each provided with adhesive tape on its vertical brims for extending the height of the dish to above 50 mm). The surface of the solution is to extend to approx. 10 mm above the glass brim of the dish while still being confined by the adhesive tape. The dishes are then placed in a thermostatised bath at 5° C. After 2.5 hours in the cooling bath, gels have formed. The dishes are taken up, the adhesive tape removed from the brim and the upper surface of the gel is cut level to the brim of the dish by means of a wire cheese slicer.

Gel Measurements

The gel modulus and rupture strength were measured on a SMS Texture Analyzer Type TA-XT2 using a plunger diameter of 1 inch and a plunger velocity of 1 mm/sec. The rigidity R (modulus) is recorded as the plunger pressure at 2 mm depression of the gel surface. The break B (rupture) is recorded as the plunger pressure at the rupture of the gel. Each measurement is made on each of the two gel dishes and averaged ($R_{avg.}$ and $B_{avg}$).

Computation of Grade Strengths

For both the sample and the standard, the concentration needed to give a defined target R value of 40.0 g is determined by intra- or extrapolating from the two $R_{avg}$ values obtained for each of the two products: sample resp. standard. These calculated concentrations are termed $YR_{SA}$ and $YR_{ST}$ respectively.

The °MIG-R is defined as: $(YR_{ST}*101/YR_{SA})$°MIG-R

Likewise, for a defined target B value of 100 g, the two concentrations $YB_{SA}$ and $YB_{ST}$ respectively are found.

The °MIG-B is defined as: $(YB_{ST}*114/YB_{SA})$°MIG-B

Example 1

In this example the lye concentration of the liquids in the tanks of the various sections in the steady state situation is calculated, and the so obtained values are used in the start-up situation in a practical experiment.

Figure 2:
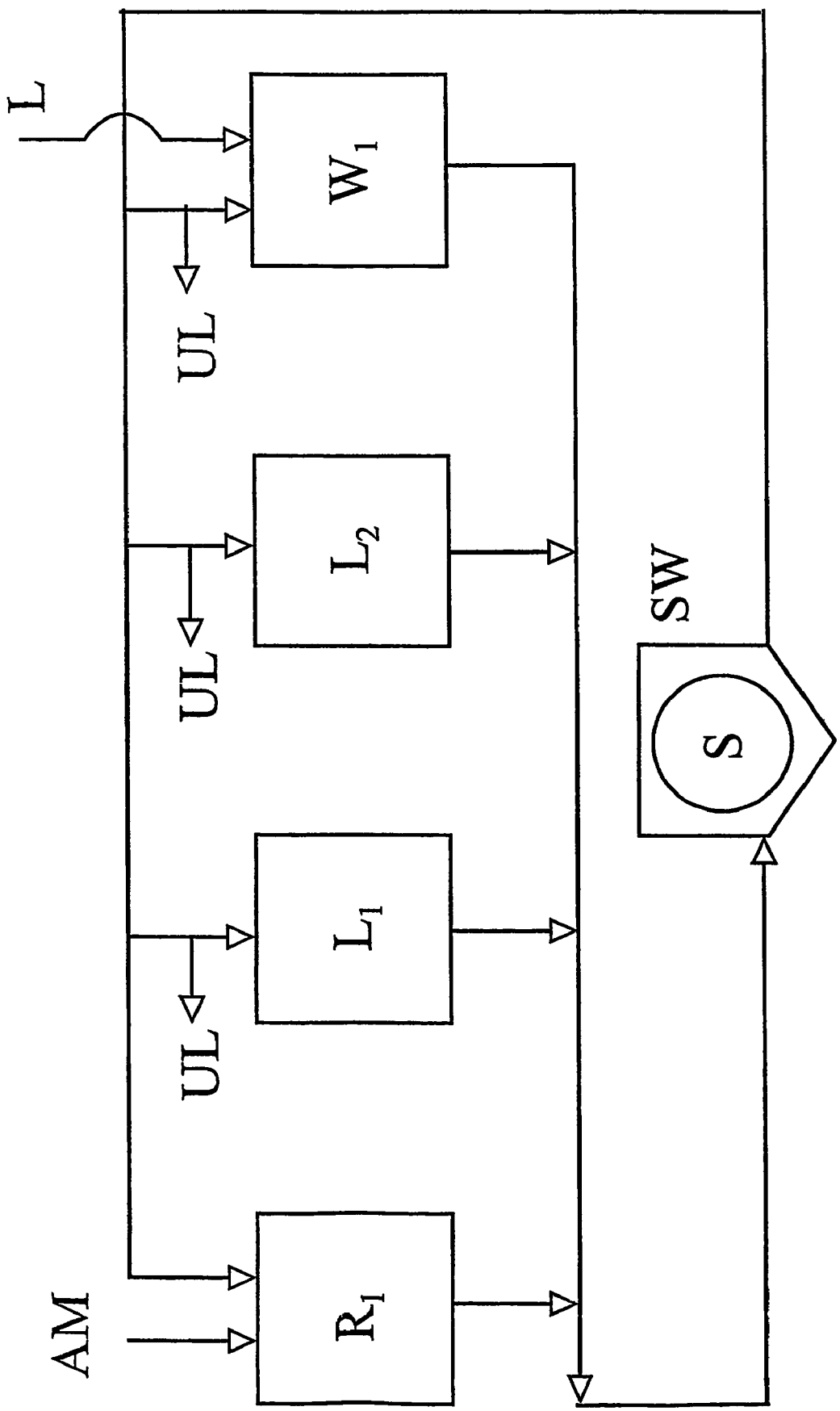
FIG. 2 depicts an outline of another example of a process set-up according to the present invention. In this process set-up, the seaweed is situated in a reactor and the liquids with which the seaweed is to be reacted are transferred to and from this reactor. This process set-up is accordingly also a batch type set-up. Thus, in FIG. 2 the seaweed (S) is situated in the reactor (SW). Again, (AM) denotes alkali medium which is added to the reaction medium tank ($R_1$). Liquids are transferred from the respective storage tanks, i.e. from the reaction medium tank ($R_1$), from the tank of the first lye recovery section ($L_1$), the tank of the second lye recovery section ($L_2$) and the tank of the washing section ($W_1$) as denoted by the arrows. After each addition the used liquid (UL) is recycled to the preceding tank relative to its origin and/or to the tank from which it originates. As in FIG. 1 liquid (L) is supplied to the tank of the washing section. Again, the process set-up accordingly comprises one reaction step, two lye recovery sections and one washing section.

The following is a theoretical computer calculation which illustrates that a steady state situation is approached regarding the alkali concentrations of the liquids in the various tanks employed in the process as more and more seaweed is processed. The calculation is performed using a PC spreadsheet application. This computer calculation imitates a batch type process having a set-up where the seaweed is situated in a reactor throughout all steps of the process and where the liquids introduced into the reactor in the different sections of the process, come from a series of storage tanks (cf. FIG. 2). The volume of liquids contained in these tanks are chosen to be of minimum value. In the simulation the number of sections in the lye recovery zone is two and the number of sections in the wash zone is one.

Based on the assumption that electrolytic equilibrium is obtained in each step between the solid phase (seaweed) and liquid phase (liquid), computer simulations were made to illustrate the lye recovery obtainable as a function of the number of batches processed.

In the calculation only the lye recovery arising from reducing the lye wash loss is considered, whereas the alkali spent on neutralization of liberated $H_2SO_4$ and other species is not considered. This means that the concentration of alkali in the spent lye is calculated considering only the dilution that the fresh lye is subjected to due to the water and solutes transferred to the liquid employed in the reaction step by each new batch of seaweed.

The start-up situation was defined in such a way that all storage tanks contain water, except for the tank containing fresh alkali used in the reaction zone, which is maintained at 4.0% (w/w) NaOH by adding NaOH afterprocessing each-batch. Other parameters constituting the basis of the calculation are: seaweed batch size, seaweed dry matter content, seaweed swell factors, reactor volume, all of which were determined empirically.

The results of the calculation are seen in FIG. 7. In FIG. 7 it is illustrated that the lye concentrations in the storage tanks of the various sections decline from the reaction step and onwards through the lye recovery sections and the wash section. It is also illustrated that the steady-state concentrations are practically reached after the processing of approximately 50 batches.

If disregarding the small recovery of the spent washing liquid from the washing section, the lye wash loss from the process, compared to the wash loss without any recovery, maybe calculated as the lye concentration in the storage tank of the last lye recovery section divided by the concentration of the spent reaction medium (steady state values), multiplied by a swell correction factor (swell factor in the last recovery section divided by swell factor in the reaction section). This gives: 64% which indicates a lye wash loss recovery of 36% by the process.

The following is a practical experiment designed to verify the calculated trends indicated by the results of the calculations above. The physical set-up is identical to the one used for the theoretical calculation, i.e. two lye recovery sections and one washing section are employed.

In the start-up situation all storage tanks contained prefabricated solutions emulating roughly the steady state compositions found in the calculations above. The fresh alkali used in the reaction section is maintained at 4.3% (w/w) NaOH by adding NaOH as a dry material. The mentioned 4.3% (w/w) NaOH will, in principle, end up at approx. 4.0% (w/w) NaOH after deducting the alkali consumption inter alia due to liberated $H_2SO_4$. As this experiment is to demonstrate only the lye recovery arising from reducing the lye wash loss, we will here consider the fresh alkali concentration as being 4.0% (w/w) NaOH.

In this experiment the lye concentration in the tanks of the various sections was measured. A total of 7 sets of measurements were made, distributed evenly over the duration of the trial. In table 2 are listed the measured data for the liquids in the various storage tanks during the processing of 48 consecutive batches.

TABLE 2

Lye Concentrations in Storage Tanks (% NaOH (w/w))

| Batch no. | Reaction medium Storage | Spent Reaction medium | 1st Lye Recovery Section Storage | 2nd Lye Recovery Section Storage | Spent Washing Medium |
|---|---|---|---|---|---|
| 1 | 4 | 3.25 | 2.7 | 2.35 | 0.67 |
| 3 | 4 | 3.17 | 3.01 | 2.23 | 0.66 |
| 12 | 4 | 3.07 | 2.87 | 2.32 | 0.62 |
| 21 | 4 | 3.31 | 2.9 | 2.27 | 0.78 |
| 30 | 4 | 3.07 | 2.79 | 2.28 | 0.96 |
| 39 | 4 | 3.13 | 2.62 | 1.88 | 0.76 |
| 48 | 4 | 3.10 | 2.68 | 1.97 | 0.46 |

FIG. 8 is a graphical representation of the data from table 2. It appears from FIG. 8 that the results arising from the above calculations, i.e. that the lye concentrations in the storage tanks of the various sections decline from the reaction step through the lye recovery sections and onwards to the washing step, are confirmed. However, it is also indicated that the real steady-state lye concentrations in the tanks of the lye recovery sections will become significantly lower (more beneficial) than what was expected from the model used in the calculation above. This may be due to the simplified assumptions used in this model and /or due to experimental variations.

If disregarding the small recovery of the spent washing liquid from the washing section, the lye wash loss from the process, compared to the wash loss without any recovery, may be calculated as the lye concentration in the storage tank of the 2nd lye recovery section divided by the concentration of the spent reaction medium (the final values reached at batch 48), multiplied by a swell correction factor (swell factor in last recovery section divided by swell factor in the reaction section). This gives: 49% which indicates a lye wash loss recovery of 51% by the process.

Example 2

The following example illustrates the trend that a build-up of solutes, derived from the neutralized NaOH, occurs in the tanks of the various sections during the processing of several batches and that a steady state situation is reached after processing a number of batches. This trend is illustrated by a theoretical calculation and confirmed by an experiment.

The following is a theoretical computer calculation. The set-up follows closely that of example 1. However, in contrast to example 1, computer simulations were now made to illustrate the effects of the other part of the alkali consumption, i.e. the part which is spent on neutralization of liberated $H_2SO_4$ and other species. This part is proportional to the seaweed amount being alkali treated, thus, the needed lye input per batch will be constant.

Other parameters constituting the basis of the calculation are: seaweed batch size, seaweed dry matter content, seaweed swell factors, reactor volume, all of which were determined empirically.

The start-up situation was defined in such a way that all storage tanks contained water, except for the tank containing the liquid to be used in the reaction step, which was started at 4.3% (w/w) NaOH. A constant amount of solid NaOH was added after each batch.

The results of the calculations are seen in FIG. 9. In FIG. 9 it is illustrated that the solute concentrations (calculated as NaOH) in the storage tanks of the various sections decline from the reaction step and onwards through the lye recovery sections and the wash section. It is also illustrated that the steady-state concentrations are practically reached after the processing of approximately 80 batches.

The following is a practical experiment designed to verify the above calculated trends.

The physical set-up is identical to the set-up of the experiment of example 1. In the start-up situation all storage tanks contain pre-fabricated solutions emulating roughly the steady state compositions found in the theoretical calculations above and in example 1. Thus the concentration of NaOH found in example 1 and the total concentration of solutes found above was used as the basis for the start-up situation. NaCl was chosen to emulate the Na-salt steady state concentrations as resulting from the built-up of solutes originating inter alia from neutralizing $H_2SO_4$. The tank containing alkali for use in the reaction step was maintained at 4.3% (w/w) NaOH by adding NaOH as a dry material. In this experiment the density as well as the dry matter content of the liquids in the tanks of the various sections were measured during the processing of 48 consecutive batches. A total of 7 sets of measurements were made, distributed evenly over the duration of the trial.

Table 3 and table 4 below list the measured data for the liquids in the process.

TABLE 3

Density of Liquids In The Process (g/ml)

| Batch No. | Reaction medium Storage | 1st Lye Recovery Section Storage | 2nd Lye Recovery Section Storage | Spent Washing Liquid |
|---|---|---|---|---|
| 1 | 1.16 | 1.13 | 1.11 | 1.03 |
| 3 | 1.17 | 1.13 | 1.11 | 1.02 |
| 12 | 1.16 | 1.14 | 1.10 | 1.01 |
| 21 | 1.18 | 1.14 | 1.10 | 1.03 |
| 30 | 1.17 | 1.14 | 1.10 | 1.03 |
| 39 | 1.17 | 1.14 | 1.08 | 1.02 |
| 48 | 1.19 | 1.15 | 1.09 | 1.02 |

TABLE 4

Concentration of Dry Matter Of Liquids In The Process (% (w/w))

| Batch No. | Reaction medium Storage | 1st Lye Recovery Section Storage | 2nd Lye Recovery Section Storage | Spent Washing Liquid |
|---|---|---|---|---|
| 1 | 21.4 | 18.4 | 15.9 | 4.1 |
| 3 | 24.0 | 20.9 | 15.9 | 3.8 |
| 12 | 22.5 | 20.4 | 14.3 | 3.6 |
| 21 | 26.4 | 19.4 | 13.7 | 4.8 |
| 30 | 23.5 | 20.0 | 15.1 | 7.0 |
| 39 | 23.0 | 18.8 | 12.5 | 9.2 |
| 48 | 25.1 | 19.8 | 17.0 | 3.5 |

FIGS. 10 and 11 are graphical representations of the data of table 3 and 4 respectively. It is seen that the density and the dry matter content trends of the storage liquids confirms the predictions arising from the calculation above, i.e. that the solute concentrations (=Na-salt) in the storage tanks of the various sections decline from the reaction step, onwards through the lye recovery sections and the wash section. It is also demonstrated that the obtained steady-state solute concentrations will become relatively high (close to saturation point), viz. approximately 25% (w/w) in the reaction medium storage tank. With 4.3% (w/w) NaOH in this tank, this leaves approx. 20% (w/w) for the Na-salt arising from the alkali consumption which result in formation of other solutes and the seaweed-accompanying salts (particularly KCl and NaCl). This compares well with the calculated steady state Na-solute concentration (calculated as NaOH) in the reaction medium storage tank of 8.3% (w/w) from the computer simulation above which upon neutralization would become approximately 12% (w/w), acquiring anions heavier than hydroxyl. The difference between the abovementioned remaining 20% (w/w) dry matter concentration and these 12% (w/w) Na-salt concentration (=8% (w/w) dry matter) would consist of the seaweed accompanying salts.

Example 3

In this example it is illustrated how the process according to the invention may be performed. Further, this example confirms that the products obtainable from the process according to the present invention have functional properties comparable to current process products. In this example seaweed was processed in a batch type process corresponding to the set-up in FIG. 2. However the process comprised one reaction step; a first and a second lye recover section; sections of counter current sequences and finally a cross current washing section. The reactor had a volume of 6 m$^3$ and each of the storage tanks had a volume of 20 m$^3$. Three trials were performed, each having different reaction medium temperature. Thus, the temperature of the reaction medium was 65° C. for trial 1, 70° C. for trial 2 and 75° C. for trial 3. Other parameter of the start-up situation appears from table 5 below.

TABLE 5

Start-up Concentrations in Various Storage Tanks (% (w/v))

| Storage Tank | NaOH | NaCl | KCl |
| --- | --- | --- | --- |
| Reaction Medium Storage Tank | 5 | 20 | 1 |
| Spent Lye Buffer Tank | 4 | 20 | 1 |
| 1$^{st}$ Lye Recovery Storage Tank | 3.2 | 17 | 1 |
| 2$^{nd}$ Lye Recovery Storage Tank | 2.5 | 13 | 1 |
| 1$^{st}$ Washing Section Storage Tank | 0 | 0 | 1 |
| 2$^{nd}$ Washing Section Storage Tank | 0 | 0 | 1 |
| 3$^{rd}$ Washing Section Storage Tank | 0 | 0 | 1 |
| 4$^{th}$ Washing Section Storage Tank | 0 | 0 | 1 |

Procedure for Trial 1, 2 and 3

The following explains the procedure for performing trials 1-3.

The Heterogenous Reaction 1,000 kg *E. cottonii* seaweed was introduced into a rotating perforated drum reactor and the reactor was filled with 5% (w/v) NaOH solution from the tank containing the reaction medium. The reaction proceeded in 2 hours during which time the temperature was maintained at the temperature setting for the trial in question by means of steam heating. The reactor was rotated at intervals.

After two hours of reaction the spent lye solution was pumped into a buffer tank from which it was transferred, at intervals, to a mixing tank where new NaOH pellets and lye recovery liquid was added before eventually being transferred back to the reaction medium storage tank. In this way the alkali solution in the reaction medium storage tank was maintained at 5.0% (w/v) corresponding to 4.3% (w/w) NaOH.

The Lye Recovery

Liquid from the tank of the 1$^{st}$ lye recovery section was then filled into the reactor to reach a level of 6.000 l. The perforated drum was rotating in 10 minutes of contacting time. Then part of this lye recovery liquid (1,200 l) was transferred to the mixing tank mentioned above, and the rest of the lye recovery liquid was recycled to the tank of the 1$^{st}$ lye recovery section.

Thereafter, liquid from the tank of the 2$^{nd}$ lye recovery section was filled into the reactor and again 10 minutes of contacting time under rotation was employed. Then part of this lye recovery solution (900 l) was transferred to the tank of the 1$^{st}$ lye recovery section, and the rest was recycled to the tank of the 2$^{nd}$ lye recovery section.

The Washings

After completing the lye recovery procedures the seaweed was washed. This was done by introducing into the reactor liquid to reach a level of 6,000 l from the tank of the 1st washing section. After 10 minutes of contacting under rotation, part (800 l) of this used washing liquid was transferred to the tank of the 2$^{nd}$ lye recovery section and the rest was discarded.

Then, liquid to reach a level of 6,000 l from the tank of the 2$^{nd}$ washing section was introduced in the reactor and the seaweed was contacted for 10 minutes under rotation and after this, the used washing liquid was transferred to the tank of the 1$^{st}$ washing section.

Next, washing liquid to reach a level of 6,000 l from the tank of the 3$^{rd}$ washing section was transferred to the reactor and again the seaweed was contacted for 10 minutes under rotation. After this, the used washing liquid was transferred to the tank of the 2$^{nd}$ washing section, and new washing liquid was added to refill the tank of the 3$^{rd}$ washing section to its original level.

Finally, new liquid from the tank of the 4$^{th}$ washing section was transferred to the reactor, the drum was rotated in 10 minutes and sulphuric acid was added to the reactor so as to obtain a pH of 8.5-9. The used washing liquid was then discarded. The tank of the 4$^{th}$ washing section was replenished with fresh washing liquid (1% KCl solution) to its original volume. Thus, the washing procedure of this example very much resembles the procedure outlined in FIG. 5a. 15 batches were processed, 5 at each temperature.

Drying and Grinding

The alkali modified seaweed was then chopped and submitted to air drying to obtain a residual humidity of 3-8%. The dried material was ground to a particle size that allows passage through a 250 micron mesh screen. The final product is termed SRC and has a residual water content of approximately 5%.

Analysis of End Product

The milk gel grade strengths ° MIG-R and ° MIG-B, on an as-is basis, of the three samples were measured as described under the Performance Grading Methods section. For comparison, a typical SRC product from a conventional plant scale process was also measured: GENU texturiser X-9513, lot no. 12 720-0. The results are seen in table 6 below.

TABLE 6

| | Alkali treatment | Milk Gel Grade Strength | |
| --- | --- | --- | --- |
| Trial No. | temperature (° C.) | ° MIG-R | ° MIG-B |
| 1 | 65 | 175 | 143 |
| 2 | 70 | 174 | 140 |

TABLE 6-continued

| Trial No. | Alkali treatment temperature (° C.) | Milk Gel Grade Strength ° MIG-R | ° MIG-B |
|---|---|---|---|
| 3 | 75 | 195 | 166 |
| X-9513 | Prior art process | 192 | 179 |

It appears from table 6 that the milk gel grade strengths increase when increasing the alkali medium temperature from 65° C. to 75° C., and that the products obtained by the method of the present invention have gel strengths comparable with typical known semirefined carrageenan products from the same seaweed.

The above description of the invention reveals that it is obvious that it can be varied in many ways. Such variations are not to be considered a deviation from the scope of the invention, and all such modifications which are obvious to persons skilled in the art are also to be considered comprised by the scope of the succeeding claims.

The invention claimed is:

1. A process for manufacturing of at least one gelling carrageenan, comprising subjecting incoming dry seaweed containing at least one gelling carrageenan precursor to: i) a heterogeneous reaction in an aqueous alkaline medium having an alkali concentration and a temperature which enable modification to a desired extent of the at least one gelling carrageenan precursor to the at least one gelling carrageenan; and ii) a recovery process comprising at least one lye recovery section for recovery of used aqueous alkaline medium employed in the heterogeneous reaction in i) by contacting the seaweed in each at least one lye recovery section with a lye recovery solution; reusing in the heterogeneous reaction of i) used aqueous alkaline medium obtained after processing the incoming seaweed in i) when processing subsequently incoming seaweed; and for each recovery section of the at least one recovery section in the recovery process of ii), reusing at least part of used lye recovery solution obtained in one section in a preceding section when processing subsequently incoming seaweed to compensate for deficiency of alkaline medium created in the heterogeneous reaction of i), and wherein a remainder of used lye recovery solution obtained in the one recovery section is reused in the same section when processing the subsequently incoming seaweed, thus forming an upstream movement of the aqueous alkaline medium employed in the process and thereby enabling recovery of said aqueous alkaline medium.

2. The process according to claim 1, comprising processing the seaweed in a batch-wise manner.

3. The process according to claim 2, comprising processing the seaweed in the heterogeneous reaction of i) and the recovery process of ii) in a single reactor containing the seaweed by supplying and removing liquids to be used in each individual section to and from this reactor.

4. The process according to claim 2, wherein the heterogeneous reaction i) and the recovery process ii) are carried out in multiple tanks containing liquids to be used in the heterogeneous reaction i) and in each individual section of the recovery process ii) respectively, through which tanks the seaweed is moved and through which tanks an upstream current of liquids to be used in the heterogeneous reaction i) and in each individual section of the recovery process ii) is established between each tank to replenish liquid deficiency arising after contact with the seaweed.

5. The process according to claim 1, comprising processing the seaweed in a continuous manner.

6. The process according to claim 1, wherein the aqueous alkaline medium comprises an alkali selected from at least one of potassium hydroxide, potassium carbonate, potassium phosphates, sodium hydroxide, sodium carbonate, sodium phosphates, or ammonia.

7. The process according to claim 6, wherein the alkali in the aqueous alkaline medium essentially comprises potassium hydroxide.

8. The process according to claim 6, wherein the alkali in the aqueous alkaline medium essentially comprises sodium hydroxide.

9. The process according to claim 1, wherein the carrageenan source is a mono-component seaweed comprising only kappa family carrageenan.

10. The process according to claim 1, wherein the seaweed is a bi-component seaweed comprising both kappa-family carrageenan and lambda-family carrageenan.

11. The process according to claim 1, further comprising adding at least one additional salt to the at least one lye recovery section, wherein the at least one additional salt is added in the heterogeneous reaction to further increase salt concentration and dissolution suppressing properties.

12. The process according to claim 1, wherein at least one additional salt is added in the heterogeneous reaction to further increase salt concentration and dissolution suppressing properties and seaweed swelling properties of the aqueous alkaline medium employed in the heterogeneous reaction.

13. The process according to claim 12, wherein the at least one additional salt is selected from the group consisting of sulfate salts and chloride salts.

14. The process according to claim 1 wherein concentration of alkali, $C_B$ in the aqueous alkaline medium at onset of the heterogeneous reaction ranges between 0% $<C_B<16$% (w/v), if the alkali is KOH, or a concentration having an equivalent carrageenan-modifying effect if the alkali is other than KOH.

15. The process according to claim 14 wherein $C_B$ ranges between 0.05% (W/V)<[CB ]$C_B<12$% (w/v).

16. The process according to claim 15 wherein $C_B$ ranges between 0.1% (W/V)<$C_B<8$%(w/v).

17. The process according to claim 1 wherein the temperature of the aqueous alkaline medium in the heterogeneous reaction ranges from 50 ° C to 95 ° C.

18. The process according to claim 17 wherein the temperature of the aqueous alkaline medium in the heterogeneous reaction ranges from 50 ° C to 85 ° C.

19. The process according to claim 18 wherein the temperature of the aqueous alkaline medium in the heterogeneous reaction ranges from 55 ° C to 80 ° C.

20. The process according to claim 19 wherein the temperature of the aqueous alkaline medium in the heterogeneous reaction ranges from 55 ° C to 75 ° C.

21. The process according to claim 1 wherein the seaweed comprises dry incoming seaweed to provide the deficiency of the alkaline medium created in the heterogeneous reaction.

22. A process according to claim 1 wherein the deficiency of the alkaline medium created in the heterogeneous reaction is provided by a volume reducing mechanism.

23. The process according to claim 22 wherein the volume reducing mechanism comprises an evaporator.

24. The process according to claim 1 including a washing process comprising at least one washing section to wash out excess alkali.

25. The process according to claim 24, wherein washing liquid in at least one of the at least one washing section comprises a bleaching agent in order to bleach the seaweed.

26. The process according to claim 25, wherein the bleaching agent comprises at least one of hypochlorite or hydrogen peroxide.

27. The method according to claim 24, wherein washing liquid in at least one of the at least one washing section comprises a potassium salt for exchanging cations bound to carrageenan polymer with potassium ions.

28. The method according to claim 27, wherein the potassium salt is selected among KCl and $K_2SO_4$.

29. The method according to claim 1, further comprising drying and grinding to obtain semirefined carrageenan (SRC).

30. The method according to claim 24, further comprising drying and grinding to obtain semirefined carrageenan (SRC).

31. The method according to claim 1, further comprising further extraction, purification and isolation to obtain refined carrageenan (RC).

32. The method according to claim 30, further comprising further extraction, purification and isolation to obtain refined carrageenan (RC).

33. The method according to claim 24, further comprising further extraction, purification and isolation to obtain refined carrageenan (RC).

34. A process for manufacturing of at least one gelling carrageenan, comprising subjecting incoming seaweed containing at least one gelling carrageenan precursor to: i) means for reducing the moisture content in the wet seaweed; ii) a heterogeneous reaction in an aqueous alkaline medium having an alkali concentration and a temperature which enable modification to a desired extent of the at least one gelling carrageenan precursor to the at least one gelling carrageenan; and iii) a recovery process comprising at least one lye recovery section for recovery of used aqueous alkaline medium employed in the heterogeneous reaction in ii) by contacting the seaweed in each at least one lye recovery section with a lye recovery solution; reusing in the heterogeneous reaction of ii) used aqueous alkaline medium obtained after processing the incoming seaweed in ii) when processing subsequently incoming seaweed; and for each recovery section of the at least one recovery section in the recovery process of iii), reusing at least part of used lye recovery solution obtained in one section in a preceding section when processing subsequently incoming seaweed to compensate for deficiency of alkaline medium created in the heterogeneous reaction of ii), and wherein a remainder of used lye recovery solution obtained in the one recovery section is reused in the same section when processing the subsequently incoming seaweed, thus forming an upstream movement of the aqueous alkaline medium employed in the process and thereby enabling recovery of said aqueous alkaline medium.

35. The process according to claim 34, wherein the means for reducing the moisture content in the wet seaweed is evaporation means.

36. The process according to claim 34, comprising processing the seaweed in a batch-wise manner.

37. The process according to claim 36, comprising processing the seaweed in the heterogeneous reaction of ii) and the recovery process of iii) in a single reactor containing the seaweed by supplying and removing liquids to be used in each individual section to and from this reactor.

* * * * *